US012500330B2

(12) United States Patent
Peng et al.

(10) Patent No.: US 12,500,330 B2
(45) Date of Patent: Dec. 16, 2025

(54) PATCH ANTENNA AND ELECTRONIC DEVICE

(71) Applicant: Huawei Technologies Co., Ltd., Shenzhen (CN)

(72) Inventors: Weibo Peng, Shenzhen (CN); Xin Xu, Shenzhen (CN); Linsheng Li, Shenzhen (CN); Timofey Kamyshev, Shenzhen (CN); Wei Shan, Shanghai (CN); Yongchao Wang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 250 days.

(21) Appl. No.: 18/259,966

(22) PCT Filed: Dec. 29, 2021

(86) PCT No.: PCT/CN2021/142515
§ 371 (c)(1),
(2) Date: Jun. 29, 2023

(87) PCT Pub. No.: WO2022/143777
PCT Pub. Date: Jul. 7, 2022

(65) Prior Publication Data

US 2024/0072415 A1 Feb. 29, 2024

(30) Foreign Application Priority Data

Dec. 31, 2020 (CN) ......................... 202011644200.2
Mar. 16, 2021 (CN) ........................ 202110283703.X

(51) Int. Cl.
*H01Q 1/24* (2006.01)
*H01Q 9/04* (2006.01)
(Continued)

(52) U.S. Cl.
CPC ........... *H01Q 1/243* (2013.01); *H01Q 9/0407* (2013.01); *H01Q 15/24* (2013.01); *H01Q 21/065* (2013.01)

(58) Field of Classification Search
CPC .... H01Q 1/243; H01Q 15/0086; H01Q 15/24; H01Q 19/005; H01Q 21/065;
(Continued)

(56) References Cited

U.S. PATENT DOCUMENTS 10,497,605 B2 * 12/2019 Parkhe .............. H01L 21/68721
10,742,315 B1 * 8/2020 Li .......................... H01Q 13/08
(Continued)

FOREIGN PATENT DOCUMENTS

CN 103534875 A 1/2014
CN 106384882 A 2/2017
(Continued)

*Primary Examiner* — Thien M Le
(74) *Attorney, Agent, or Firm* — Conley Rose, P.C.

(57) ABSTRACT

A patch antenna includes a plurality of patch units, a first feeding branch, and a second feeding branch. The plurality of patch units is symmetric relative to a virtual symmetry axis. The plurality of patch units is arranged at intervals. A gap is formed between adjacent patch units, and the adjacent patch units are coupled through the gap. The first feeding branch and the second feeding branch are symmetric relative to the symmetry axis, and each of the first feeding branch and the second feeding branch is electrically connected to at least one patch unit of the plurality of patch units. The first feeding branch is configured for a first polarization of the patch antenna, and the second feeding branch is configured for a second polarization of the patch antenna.

20 Claims, 15 Drawing Sheets

(51) Int. Cl.
*H01Q 15/24* (2006.01)
*H01Q 21/06* (2006.01)

(58) Field of Classification Search
CPC ...... H01Q 21/08; H01Q 21/24; H01Q 9/0407; H01Q 9/045; H01Q 1/22; H01Q 1/38; H01Q 1/50; H01Q 13/10
See application file for complete search history.

(56) References Cited

U.S. PATENT DOCUMENTS

| | | | | |
|---|---|---|---|---|
| 11,069,985 | B1 * | 7/2021 | Noah | H01Q 1/38 |
| 11,462,831 | B2 * | 10/2022 | Choi | G06K 19/07775 |
| 2012/0287002 | A1 | 11/2012 | Parsche | |
| 2014/0158198 | A1 * | 6/2014 | Simovski | B82Y 20/00<br>438/69 |
| 2017/0271770 | A1 * | 9/2017 | Lin | H01Q 9/0428 |
| 2018/0102594 | A1 * | 4/2018 | Murdock | H01Q 1/48 |
| 2018/0372563 | A1 * | 12/2018 | Rogers | H01Q 9/0428 |
| 2019/0020714 | A1 * | 1/2019 | Lee | H01Q 1/243 |
| 2019/0058264 | A1 * | 2/2019 | Jung | H01Q 9/0435 |
| 2020/0313299 | A1 | 10/2020 | Jia | |

FOREIGN PATENT DOCUMENTS

| | | | |
|---|---|---|---|
| CN | 108461929 | A | 8/2018 |
| CN | 208385625 | U | 1/2019 |
| CN | 110011049 | A | 7/2019 |
| CN | 110048224 | A | 7/2019 |
| CN | 110828973 | A | 2/2020 |
| WO | 2020145419 | A1 | 7/2020 |

* cited by examiner

PATCH ANTENNA AND ELECTRONIC DEVICE

CROSS-REFERENCE TO RELATED APPLICATIONS

This is a National Stage of International Patent Application No. PCT/CN2021/142515 filed on Dec. 29, 2021, which claims priority to Chinese Patent Application No. 202110283703.X filed on Mar. 16, 2021 and Chinese Patent Application No. 202011644200.2 filed on Dec. 31, 2020, all of which are hereby incorporated by reference in their entireties.

TECHNICAL FIELD

This application relates to the field of wireless communication technologies, and in particular, to a patch antenna and an electronic device.

BACKGROUND

With development of communication technologies, to implement a 5G (5th-Generation, 5th-generation) mobile communication function, a mobile phone is generally integrated with a corresponding 5G antenna. However, due to limited space inside the mobile phone, an antenna on display (AOD, Antenna on Display) of the mobile phone has also become one of development directions of 5G technologies. However, a thickness of a display module of the mobile phone is a very small, and is usually only hundreds of micrometers, and there are some difficulties in constructing an antenna in the display module with a small thickness range.

SUMMARY

An objective of this application is to provide a patch antenna and an electronic device, to resolve a problem that an existing antenna cannot be disposed in a display module.

To resolve the foregoing technical problem, this application provides a patch antenna. The patch antenna includes a plurality of patch units, a first feeding branch, and a second feeding branch. The plurality of patch units are symmetric relative to a virtual symmetry axis. The plurality of patch units are arranged at intervals. A gap is formed between adjacent patch units, and the adjacent patch units are coupled through the gap. The first feeding branch and the second feeding branch are symmetric relative to the symmetry axis, and is electrically connected to at least one of the plurality of patch units. The first feeding branch is configured for a first polarization of the patch antenna, and the second feeding branch is configured for a second polarization of the patch antenna. Based on this, the patch antenna may have a low profile. For example, the profile of the patch antenna is 0.2λ or 0.3λ, so as to be used as a part of the display module. In addition, the patch antenna may further support millimeter wave bands such as n257 and n258, or may support another communication or data transmission requirement, to meet a wireless communication requirement.

In some embodiments, the gap includes a first gap and a second gap, the first gap is perpendicular to the second gap, and the plurality of patch units are coupled to each other by using the first gap and the second gap.

In some embodiments, the first feeding branch is located on one side of the symmetry axis. The first feeding branch includes a first feeding part configured to directly feed at least one of the plurality of patch units.

In some embodiments, the second feeding branch is located on the other side of the symmetry axis, and the second feeding branch includes a second feeding part configured to directly feed at least one of the plurality of patch units. The first feeding part and the second feeding part are symmetric relative to the virtual symmetry axis.

In some embodiments, the first feeding part is configured to directly feed two of the plurality of patch units, and the second feeding part is configured to directly feed two of the plurality of patch units.

In some embodiments, an angle between the first feeding part and the symmetry axis is +45°, and an angle between the second feeding part and the symmetry axis is −45°, so as to implement dual polarization of the patch antenna.

In some embodiments, a width of the first gap ranges from 0.05 mm to 0.15 mm, and a width of the second gap ranges from 0.05 mm to 0.15 mm.

In some embodiments, sizes of all the plurality of patch units are the same.

In some embodiments, a shape of each of the plurality of patch units is a square, and an overall shape of the plurality of patch units is a square.

In some embodiments, a side length of the square consisting of the plurality of patch units ranges from 2 mm to 4 mm.

In some embodiments, the patch antenna works in at least a millimeter wave band n257 or n258, or the patch antenna works in a non-millimeter wave band.

In some embodiments, a quantity of the plurality of patch units is four, and the four patch units are arranged at intervals in a 2×2 form. In some other embodiments, a quantity of the plurality of patch units is nine, and the nine patch units are arranged at intervals in a 3×3 form. Based on this, the patch antenna may have a large radiator or a large radiation area, to enhance overall directivity of the array antenna and improve a gain of the array antenna.

In some embodiments, the plurality of patch units include a transparent conductive patch, or the plurality of patch units include a metal mesh. It should be understood that when the patch unit is a metal mesh, a light transmittance of the display module in an area corresponding to the patch antenna can be increased, and a possibility that the patch antenna is observed by a user can be reduced.

In some embodiments, a material of the plurality of patch units includes indium tin oxide, silver oxide, copper, aluminum, or silver paste.

In some embodiments, there are two first feeding parts, and the two first feeding parts are disposed in parallel, and are electrically connected to two of the plurality of patch units.

In some embodiments, the first feeding branch further includes a first transmission part and a first connection part. The first connection part has a first input end, a first output end, and a second output end. The first input end is electrically connected to the first transmission part, the first output and is electrically connected to one first feeding part, and the second output end is electrically connected to the other first feeding part.

In some embodiments, a width of the first transmission part ranges from 0.2 mm to 0.8 mm, a width of the first input end ranges from 0.2 mm to 0.8 m, a width of the first output end and a width of the second output end range from 0.1 mm to 0.5 mm, and a width of the first feeding part ranges from 0.5 mm to 0.8 mm.

In some embodiments, the patch unit includes a first patch unit and a plurality of second patch units that are disposed at intervals. The plurality of second patch units are disposed around the first patch unit and are disposed at intervals with the first patch unit. The gaps are formed between the plurality of adjacent second patch units and between the plurality of second patch units and the first patch unit. The first patch unit and the plurality of second patch units are coupled through the gaps.

In some embodiments, the gap formed between the plurality of adjacent second patch units includes a first gap and a second gap, where the first gap is perpendicular to the second gap, or an included angle between the first gap and the second gap ranges from 60° to 120°.

In some embodiments, a shape of the first patch unit is a circle, a shape of each of the plurality of second patch units is a sector ring, and a center of the first patch unit coincides with a center of each of the plurality of second patch units.

This application further provides an antenna film. The antenna film includes a dielectric layer and the patch antenna described in the foregoing embodiment. A plurality of patch antennas are disposed on the dielectric layer at intervals along a preset direction. It should be understood that, when a related antenna structure needs to be disposed in a display module, the antenna film may be used as a part of the display module in a process of assembling the display module.

In some embodiments, the patch antenna further includes a feeding line, the feeding line includes a first feeding line and a second feeding line, the first feeding line is electrically connected to the first feeding branch, and the second feeding line is electrically connected to the second feeding branch, to separately transmit signals to the first feeding branch and the second feeding branch.

In some embodiments, the feeding line further includes a plurality of grounding wire, and the first feeding line and the second feeding line are spaced between the plurality of grounding wires. Based on the grounding wires, a possibility of generating parasitic capacitance or parasitic inductance due to mutual inductance between the first feeding line and the second feeding line can be reduced, and isolation between the first polarization and the second polarization of the array antenna can be increased.

In some embodiments, the dielectric layer includes a main part and an extension part. The extension part is located on one side of the main part. Both the patch unit and a feeding unit are located on the main part. The feeding line is located on the extension part and is configured to be electrically connected to a circuit board component. It should be understood that the extension part may be bent relative to the main part, so as to be bound/bonded with a flexible circuit board.

In some embodiments, a distance between symmetry axes of adjacent patch antennas ranges from 5 mm to 10 mm.

In some embodiments, the dielectric layer includes a PET film, a COP film, a COC film, or a CPI film.

This application further provides a display module. The display module includes a display layer and the antenna film described in the foregoing embodiment. The antenna film is disposed on the display layer, and the display layer has a display function and serves as a reference ground of the patch antenna.

In some embodiments, the display module further includes a polarizer layer. The antenna film is located between the display layer and the polarizer layer, or the polarizer layer is located between the display layer and the antenna film.

In some embodiments, a distance between the antenna film and the display layer ranges from 100 μm to 500 μm. It should be understood that the array antenna provided in embodiments of this application has an ultra-low profile (100 μm to 500 μm) feature, so as to be compatible with display modules of different types and different specifications.

This application further provides an electronic device. The electronic device includes a circuit board component and the display module in the foregoing embodiment. The circuit board component is electrically connected to the display module. The electronic device may be a mobile phone, a tablet computer, or another electronic device that has a screen and can implement wireless communication.

In some embodiments, the circuit board component includes a flexible circuit board and a radio frequency chip, the radio frequency chip is disposed on the flexible circuit board, and the flexible circuit board is electrically connected to the radio frequency chip and the patch antenna.

In some embodiments, when the antenna film does not include a feeding line or includes a part of a feeding line, the flexible circuit board further includes a feeding line, and the feeding line is electrically connected to the radio frequency chip and the antenna. The feeding line includes a first feeding line and a second feeding line, the first feeding line is electrically connected to the first feeding branch, and the second feeding line is electrically connected to the second feeding branch.

In some embodiments, the feeding line further includes a plurality of grounding wire, and the first feeding line and the second feeding line are spaced between the plurality of grounding wires. Based on the grounding wires, a possibility of generating parasitic capacitance or parasitic inductance due to mutual inductance between the first feeding line and the second feeding line can be reduced, and isolation between the first polarization and the second polarization of the array antenna can be increased.

In some embodiments, the circuit board component further includes a heat sink. The heat sink is located on a side that is of the flexible circuit board and that is back to the radio frequency chip, so as to improve heat dissipation performance of the flexible circuit board when the flexible circuit board works, and improve overall strength of the flexible circuit board 181.

In some embodiments, the circuit board component further has a connector and a printed circuit board. The connector is disposed on the flexible circuit board, and is electrically connected to the flexible circuit board and the printed circuit board.

In this application, the plurality of patch units are arranged at intervals, and the plurality of patch units are coupled through the gap, so that a formed patch antenna has a low profile, and can support millimeter wave bands such as n257 and n258, or can support another communication or data transmission requirement. In this way, the patch antenna can be conveniently disposed in the display module, and a communication experience requirement of the user can be met.

DESCRIPTION OF EMBODIMENTS

Figure 1:
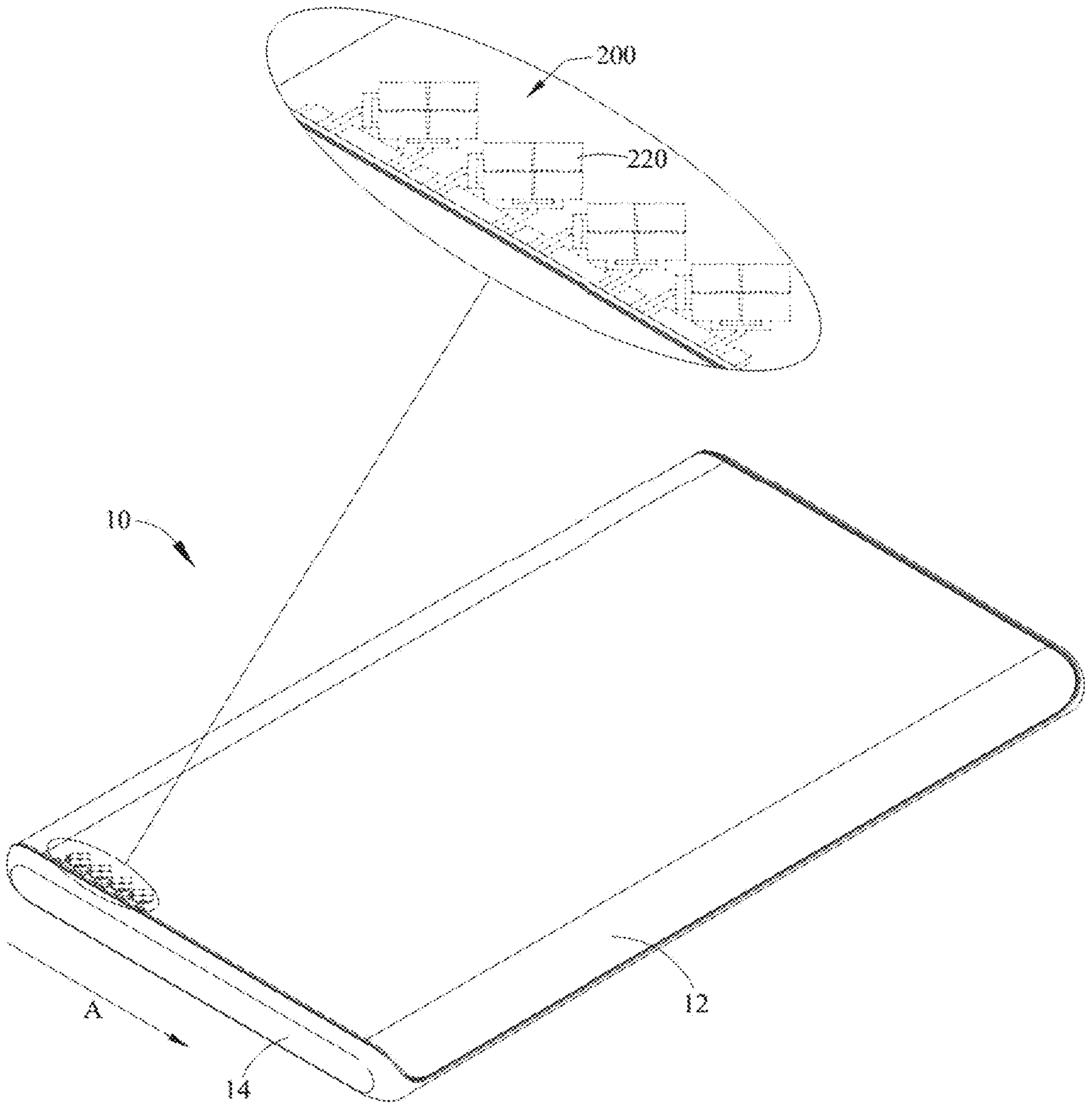
FIG. 1 is a three-dimensional diagram of an electronic device according to an embodiment of this application.

The following clearly and completely describes the technical solutions in embodiments of this application with reference to the accompanying drawings in embodiments of this application.

It should be understood that, in this application, "electrically connected" may be understood as a form in which components are physically in contact and are electrically conducted, or may be understood as a form in which different components are connected by using a physical line that can transmit an electrical signal, for example, a printed circuit board (Printed Circuit Board, PCB) copper foil or a conducting wire, in a line structure. Both "connected" and "connection" may refer to a mechanical connection relationship or a physical connection relationship. For example, A is connected to B or a connection between A and B may mean that there is a fastening component (for example, a screw, a bolt, or a nail) between A and B, or A and B are in contact with each other and A and B are difficult to be separated.

In this application, a "length" may be understood as a physical length of an object, or may be understood as an electrical length. An electrical length may be represented by multiplying a physical length (namely, a mechanical length or a geometric length) by a ratio of transmission time of an electrical or electromagnetic signal in a medium to time required when the signal passes through a distance the same as the physical length of the medium in free space. The electrical length may meet the following formula:

$$\bar{L} = L \times \frac{a}{b},$$

where

L is the physical length, a is the transmission time of the electrical or electromagnetic signal in the medium, and b is the transmission time in free space.

Alternatively, the electrical length may be a ratio of a physical length (namely, a mechanical length or a geometric length) to a wavelength of a transmitted electromagnetic wave, and the electrical length may meet the following formula:

$$\bar{L} = \frac{L}{\lambda},$$

where

L is the physical length, and λ is the wavelength of the electromagnetic wave.

Coupling is a phenomenon that input and output of two or more than two circuit elements or electrical networks closely cooperate with each other and affect each other, and energy is transmitted from one side to another side through interaction.

Antenna pattern: The antenna pattern is also referred to as a radiation pattern. The antenna pattern refers to a pattern in which relative field strength (a normalized modulus value) of an antenna radiation field changes with a direction at a specific distance from the antenna. The antenna pattern is usually represented by two plane patterns that are perpendicular to each other in a maximum radiation direction of an antenna.

The antenna pattern usually includes a plurality of radiation beams. A radiation beam with highest radiation strength is referred to as a main lobe, and another radiation beam is referred to as a minor lobe or side lobe. In minor lobes, a minor lobe in an opposite direction of the main lobe is also referred to as a back lobe.

Antenna gain: The antenna gain represents a degree to which the antenna intensively radiates input power. Usually, a narrower main lobe of the antenna pattern indicates a smaller minor lobe, and a higher antenna gain.

Antenna radiation efficiency: The antenna radiation efficiency is a ratio of power radiated by the antenna to space (namely, power that is effectively converted into an electromagnetic wave) to active power input to the antenna. Herein, active power input to the antenna=input power of the antenna−return loss. The return loss mainly includes an ohmic loss and/or a dielectric loss of metal.

Antenna return loss: The antenna return loss may be understood as a ratio of power of a signal reflected back to an antenna port through an antenna circuit to transmit power of the antenna port. A smaller reflected signal indicates a larger signal radiated by the antenna to space and higher radiation efficiency of the antenna. A larger reflected signal indicates a smaller signal radiated by the antenna to space and lower radiation efficiency of the antenna.

The antenna return loss may be represented by an S11 parameter, and the S11 parameter is usually a negative number. A smaller S11 parameter indicates a smaller return loss of the antenna and higher radiation efficiency of the antenna. A larger S11 parameter indicates a larger return loss of the antenna and lower radiation efficiency of the antenna.

Antenna isolation: The antenna isolation is a ratio of power of a signal transmitted by the antenna to power of another signal received by the antenna, and may be represented by an S21 parameter and an S12 parameter.

Reference ground (also referred to as a floor): The reference ground may be formed by a circuit board. The circuit board may be a printed circuit board, for example, an 8-layer, 10-layer, or 12-layer to 14-layer board having 8, 10, 12, 13, or 14 layers of conductive material, or an element that is separated and electrically insulated by a dielectric layer or an insulation layer, for example, glass fiber, polymer, or the like. The circuit board usually includes a dielectric substrate, a floor, and a wiring layer. The wiring layer; conductive layer is electrically connected by using a via hole, and may form a floor as a whole. Components such as a display, a touchscreen, an input button, a transmitter, a processor, a memory, a battery, a charging circuit, and a system on chip (System on Chip, SoC) structure may be mounted on the circuit board or connected to the circuit board, or may be electrically connected to the wiring layer/conductive layer in the circuit board. For example, a radio frequency source is disposed at the wiring layer. The floor is made of a conductive material. The conductive material may be any one of the following materials: copper, aluminum, stainless steel, brass, an alloy thereof, copper foil on an insulation substrate, aluminum foil on an insulation substrate, gold foil on an insulation substrate, silver-plated copper, silver-plated copper on an insulation substrate, silver foil and tin-plated copper on an insulation substrate, cloth impregnated with graphite powder, a graphite-coated substrate, a copper-plated substrate, a brass-plated substrate, and an aluminum-plated substrate. A person skilled in the art may understand that the floor may also be made of another conductive material. Alternatively, the floor may be a metal film below a screen of an electronic device (for example, a mobile phone).

With development of communication technologies, in an electronic device of a type such as a mobile phone, to implement a 5G (5th-Generation, fifth generation) mobile communication function, a corresponding antenna is usually integrated. As a screen-to-body ratio of a mobile phone increases, disposing an antenna on display (AOD, Antenna on Display) of the mobile phone also becomes a development direction of 5G technologies.

However, a thickness of a display module of the mobile phone is very small, and is usually only hundreds of micrometers, for example, 500 μm or 550 μm. Therefore, there are also some difficulties in constructing an antenna in the display module with a small thickness range.

The antenna cannot increase the thickness of the display module too much. Otherwise, poor display of the display module is easily caused, and assembly of the display module is not conducive. Therefore, the antenna disposed in the display module needs to have a low profile, to ensure wireless communication effect. However, a profile of an existing antenna is still high. As a result, a thickness of a display module using the existing antenna is large, and a thickness of an electronic device is also affected. However, if the existing antenna is disposed in a case in which the thickness of the display module is controlled, a bandwidth, isolation, and the like of the existing antenna are affected to some extent. For example, the isolation of the existing antenna can only reach −5 dB to −6 dB.

In addition, the antenna disposed in the display module further needs to have a specific resonant band, to support a band range specified in 5G. However, the bandwidth of the existing antenna is narrow due to factors, for example, the profile. For example, the existing antenna can meet only a band of 26 GHz to 28 GHz, a band of n257 is 26.5 GHz to 29.5 GHz, and a band of n258 is 24.25 GHz to 27.5 GHz. The existing antenna cannot well meet a band specified in 5G.

Refer to FIG. 1. Based on the foregoing problems, an embodiment of this application provides an electronic device 10, including a display module 12 disposed with an array antenna 220. The array antenna 220 may be disposed on the dielectric layer (not shown in the figure) through printing, etching, chemical plating, or the like. It should be understood that the dielectric layer disposed with the array antenna 220 may also be used as a separate antenna film 200. If a related antenna structure needs to be disposed in the display module 12 of the electronic device 10, the antenna film 200 may be used as a part of the display module 12 in a process of assembling the display module 12.

Based on this, the array antenna 220 may radiate an electromagnetic wave to free space when working, to implement a wireless communication function. Because the array antenna 220 is disposed inside the electronic device 10, for ease of understanding, the array antenna 220 in FIG. 1 is presented by using a dashed line.

It should be understood that, in the display module 12 provided in embodiments of this application, the array antenna 220 of the antenna film 200 may exhibit features such as a low profile, a low loss, and a high bandwidth. These features may meet a definition of a metasurface (Metasurface) on a whole. Therefore, the array antenna 220 may be used as a metasurface array antenna. The metasurface is an artificial laminated material whose thickness is less than a wavelength. A metasurface antenna may be roughly understood as an antenna formed on a whole by dividing a large patch into a plurality of small patches, arranging the plurality of small patches according to a specific rule, and coupling the plurality of small patches through a gap. Based on this, a height of a profile of the array antenna 220 provided in embodiments of this application is approximately 150 μm to 300 μm, and the profile may be understood as an ultra-low profile. Based on this, the array antenna 220 may be relatively conveniently compatible with the display module 12, and is used as a part of the display module 12. In addition, the array antenna 220 may basically meet the foregoing band ranges of n257 and n258, to implement a 5G mobile communication function.

It should be understood that the electronic device 10 in embodiments of this application is mainly described by using a mobile phone as an example. However, this does not constitute a limitation. In some other embodiments, the electronic device 10 may also be a tablet computer; or the electronic device 10 may also be another electronic device that has a screen and that can implement wireless communication, for example, a television or a smartwatch.

In some embodiments, in addition to the foregoing band ranges of n257 and n258, through adjustment of a size, a specification, and the like of the array antenna 220, the array antenna 220 may further support a band of n260 (37 GHz to 40 GHz), or may support another millimeter wave or non-millimeter wave communication band. For example, the array antenna 220 may further support a non-millimeter wave band, for example, 1 GHz to 3 GHz, or the array antenna 220 may support bands corresponding to Wi-Fi, Bluetooth, and ZigBee. A band range and an application scenario to which the array antenna 220 is applicable are not limited in this application. For example, the array antenna 220 provided in embodiments of the present invention may be applied to a wireless communication scenario, for example, a wireless metropolitan area network (Wireless Metropolitan Area Network, WWAN), a wireless wide area network (Wireless Wide Area Network, WWAN), a wireless local area network (Wireless Local Area Network, WLAN), a wireless personal area network (Wireless Personal Area Network, WPAN), multiple-input multiple-output (MIMO), radio frequency identification (Radio Frequency Identification, RFID), near field communication (Near Field Communication, NFC), wireless power consortium (Wireless Power Consortium, WPC), and frequency modulation (Frequency Modulation, FM), to meet a communication requirement of a user in a corresponding application scenario.

In some embodiments, the display module 12 may have a touch function, to serve as a touchable display module. In some other embodiments, the display module 12 may also have no touch control function. This is not limited herein.

In some embodiments, a type of the display module 12 may include an active light emitting display module or a passive light emitting display module. The active light emitting display module may be, for example, an OLED display module. The passive light emitting display module may be, for example, a liquid crystal display module. When the display module 12 is a liquid crystal display module, the electronic device 10 may further include a backlight source, and the backlight source may provide backlight for the liquid crystal display module.

Figure 2:
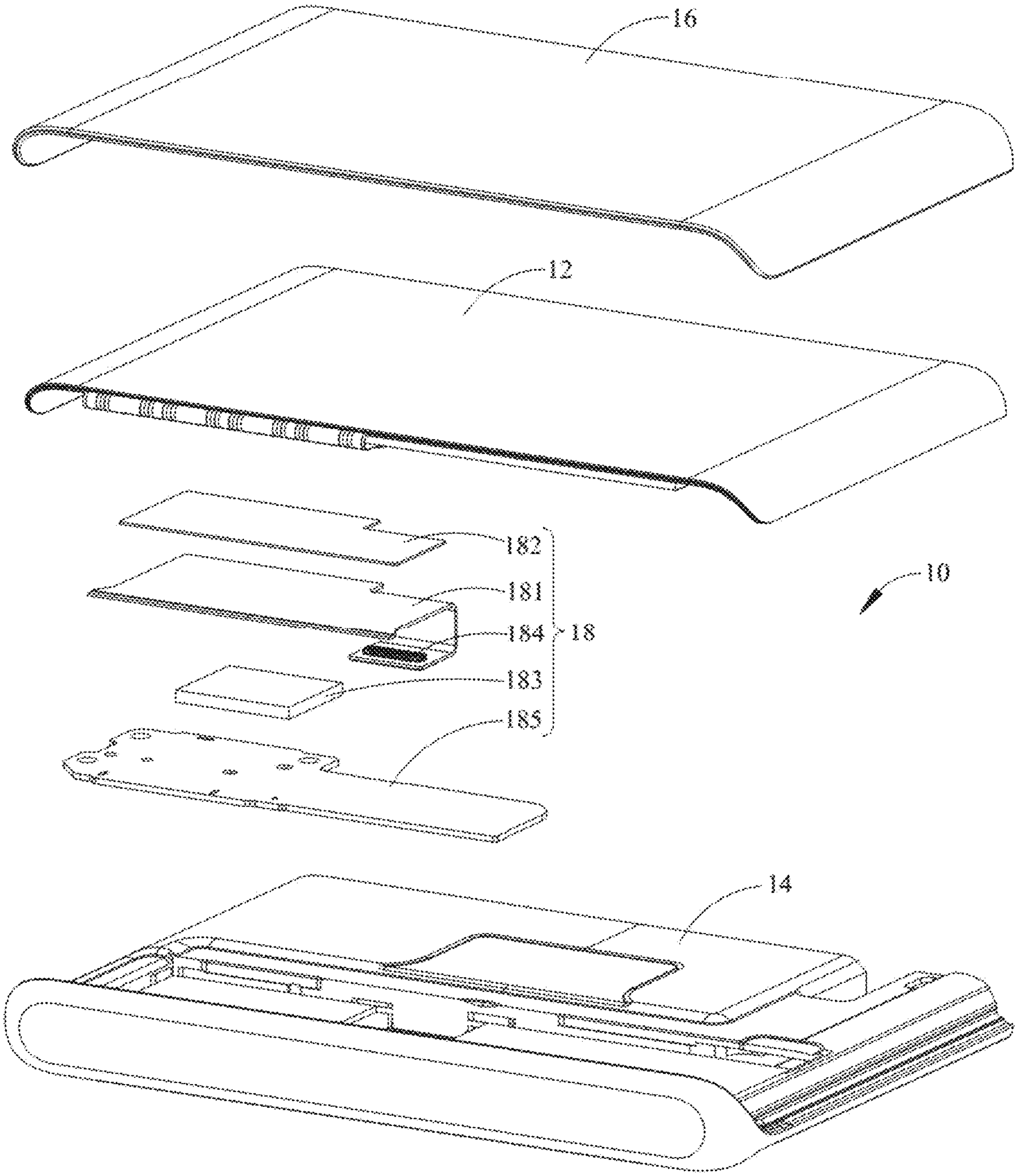
FIG. 2 is a partial exploded view of an electronic device according to an embodiment of this application.

Refer to both FIG. 1 and FIG. 2. In some embodiments, the electronic device 10 may further include a frame 14 and a cover plate 16, and the cover plate 16 is disposed on one side of the frame 14. Space formed by encircling the cover plate 16 and the frame 14 is internal space of the electronic device 10, and other space relative to the internal space may be referred to as free space. The display module 12 is located on one side of the cover plate 16, and is disposed in the internal space. The cover plate 16 can protect the display module 12.

A surface that is of the cover plate 16 and that faces the free space may be understood as a front surface of the electronic device 10, and a light-emitting side of the display module 12 faces the cover plate 16. When the display module 12 works, light emitted by the display module 12 or the backlight source may pass through the cover plate 16 and may be emitted to the free space. When the user watches the front surface of the electronic device 10, the light may be incident into the eyes of the user, so that the user obtains related information. It should be understood that, because a dielectric layer is further disposed in the display module 12, the array antenna 220 on the dielectric layer may radiate an electromagnetic wave to the free space when working, and the electromagnetic wave may be received by another antenna for communication, or the array antenna 220 may be used as a receive antenna to receive an electromagnetic wave radiated by a base station or another device for communication. A wavelength of the electromagnetic wave may range from, for example, 1 mm to 10 mm, and the electromagnetic wave of the wavelength may also be referred to as a millimeter wave.

In some embodiments, the array antenna 220 may include a transparent conductive material. The transparent conductive material may include, for example, indium tin oxide (ITO), silver oxide, copper or an alloy thereof, aluminum or an alloy thereof, or silver paste. In this way, when the display module 12 including the array antenna 220 is assembled into the electronic device 10, light can well pass through the array antenna 220 to be emitted to the free space. In addition, it is not easy for the user to observe the array antenna 220 in the display module 12.

In some embodiments, the frame 14 may include a metal material and/or a plastic material. The metal material may include, for example, stainless steel or an aluminum alloy.

In some embodiments, the cover plate 16 may be made of a glass material, a sapphire material, a ceramic material, or the like. This is not limited herein. Based on this, when the array antenna 220 of the display module 12 radiates the electromagnetic wave to the free space, interference from metal or the like is weak. This ensures stable receiving and sending of the electromagnetic wave.

Figure 3:
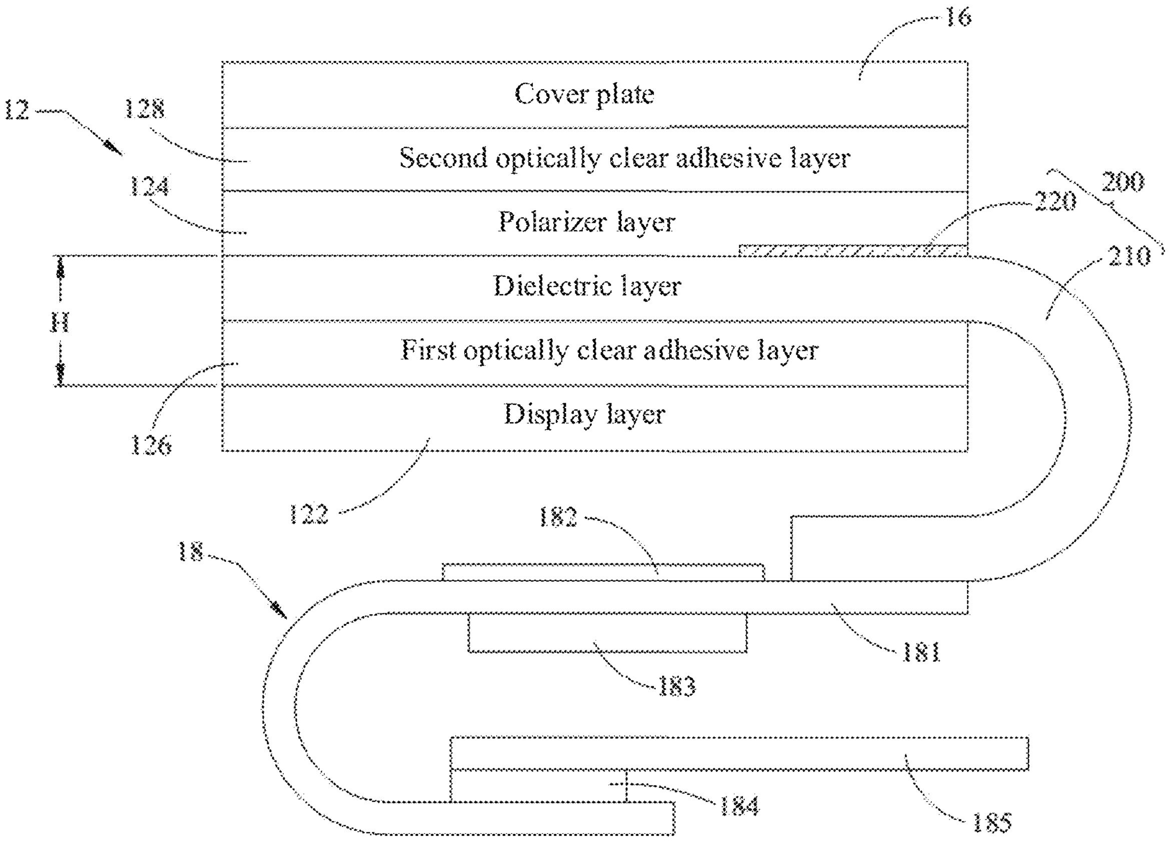
FIG. 3 is a schematic diagram of a cover plate, a display module, and a circuit board component according to an embodiment of this application.

Refer to both FIG. 2 and FIG. 3. In some embodiments, the electronic device 10 may further include a circuit board component 18. The circuit board component 18 may be electrically connected to the display module 12, to cooperate with the display module to implement functions such as receiving and sending of the electromagnetic wave and displaying.

In some embodiments, the circuit board component 18 includes a flexible circuit board (FPC) 181. The flexible circuit board 181 may be located on one side of the display module 12 and far away from the cover plate 16. The flexible circuit board 181 may be integrated with electronic elements such as a related chip, a resistor, a capacitor, and a connector that are required for radio frequency transmission. As shown in FIG. 2 and FIG. 3, the flexible circuit board 181 is integrated with a radio frequency chip 183. The radio frequency chip 183 may be a millimeter-wave chip or a non-millimeter-wave chip.

In some embodiments, a heat sink 182 may be further disposed on a side that is of the flexible circuit board 181 and that is opposite to the electronic element. It should be understood that the heat sink 182 may include a metal material. Based on this, the heat sink 182 can improve heat dissipation performance of the flexible circuit board 181 when the flexible circuit board 181 works, and can further improve overall strength of the flexible circuit board 181.

In some embodiments, the circuit board component 18 may further include a printed circuit board (PCB) 185. To implement a connection between the array antenna 220 and the printed circuit board 185, the flexible circuit board 181 may be bent. Based on this, the flexible circuit board 181 may be electrically connected to the printed circuit board 185 by using a connector 184. It should be understood that a heat sink (not shown in the figure) may also be disposed on a side that is of the flexible circuit board 181 and that is opposite to the connector 184, to improve heat dissipation performance of the flexible circuit board 181 when the flexible circuit board 181 works, and improve overall strength of the flexible circuit board 181.

Refer to both FIG. 2 and FIG. 3. In some embodiments, the array antenna 220 on the dielectric layer 210 needs to be electrically connected to the flexible circuit board 181, and the dielectric layer 210 and the flexible circuit board 181 are spaced. Based on this, at least one of the flexible circuit board 181 and the dielectric layer 210 may be flexibly bent to some extent, to implement binding/bonding (bonding) between the flexible circuit board 181 and the dielectric layer 210, and implement an electrical connection between the circuit board component 18 and the display module 12. For example, in both FIG. 2 and FIG. 3, the dielectric layer 210 is bent to be bound/bonded with the flexible circuit board 181. However, this does not constitute a limitation.

Figure 4:
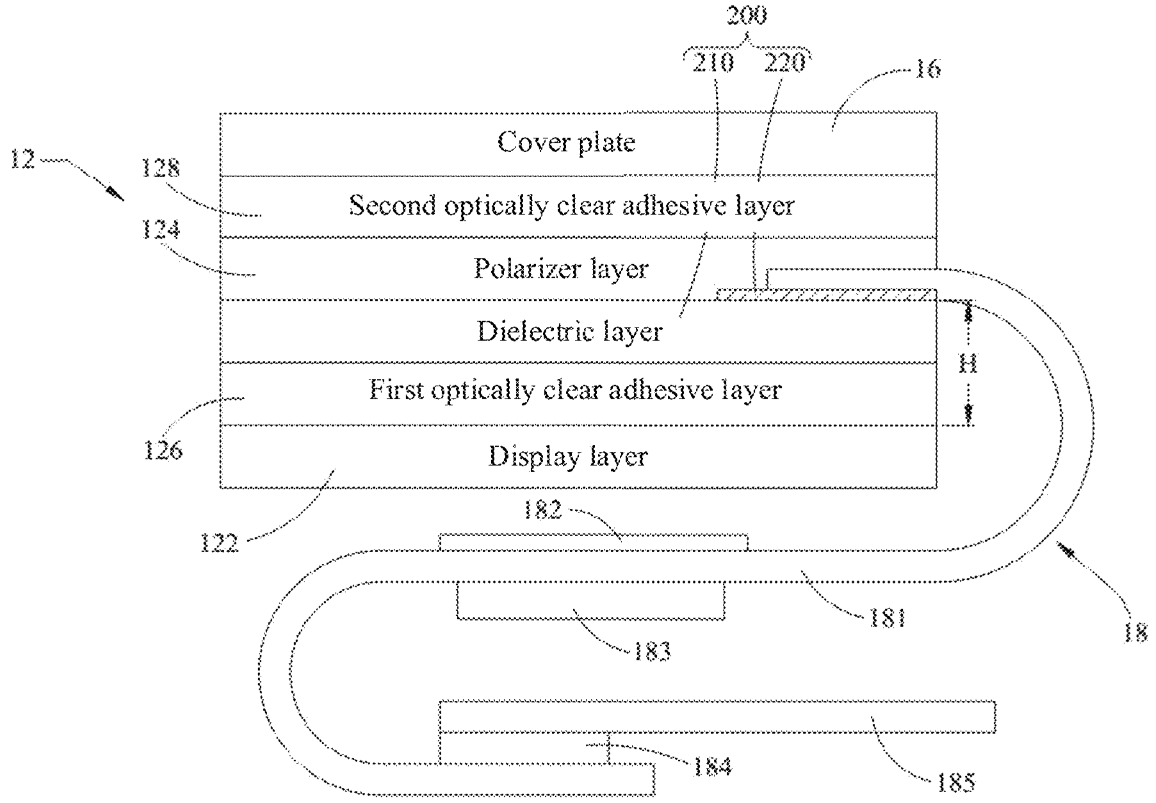
FIG. 4 is a schematic diagram of a cover plate, a display module, and a circuit board component according to another embodiment of this application.

Refer to FIG. 3 and FIG. 4 for comparison. Different from the example in which the dielectric layer 210 is bent, in some other embodiments, the flexible circuit board 181 is bent, and the bent flexible circuit board 181 may extend towards the display module 12, to be bound/bonded with the array antenna 220 on the dielectric layer 210.

Refer to both FIG. 3 and FIG. 4. In some embodiments, the display module 12 includes a display layer 122, the dielectric layer 210, and a polarizer (POL, Polarizer) layer 124. In addition to implementing a display function, the display layer 122 may be further used as a reference ground of the array antenna 220. The polarizer layer 124 can reduce a light reflection degree of the display module 12 and improve a contrast of the display module 12.

In some embodiments, the display module 12 may further include a first optically clear adhesive layer (OCA, Optically Clear Adhesive) layer 126 and a second optically clear adhesive layer 128. The first optically clear adhesive layer 126 and the second optically clear adhesive layer 128 may implement bonding between the display layer 122, the dielectric layer 210, and the polarizer layer 124.

As shown in FIG. 3 and FIG. 4, the display layer 122, the first optically clear adhesive layer 126, and the dielectric layer 210 are sequentially disposed. The polarizer layer 124 may be disposed between the dielectric layer 210 and the second optically clear adhesive layer 128. In this embodiment, a distance H between the dielectric layer 210 and the display layer 122 is approximately 100 μm to 200 μm. The distance H may be a shortest distance (or a straight-line distance) between a surface of the display layer 122 and a surface that is of the dielectric layer 210 and that is away from the display layer 122. For example, the distance H between the dielectric layer 210 and the display layer 122 is 100 μm, 110 μm, 120 μm 130 μm, 140 μm, 150 μm, 160 μm, 170 μm, 180 μm, 190 μm, 200 μm, or the like.

It should be understood that in this embodiment of this application, an example in which the dielectric layer 210 is located between the polarizer layer 124 and the first optically clear adhesive layer 126 is mainly used for description. However, this does not constitute a limitation.

Figure 5:
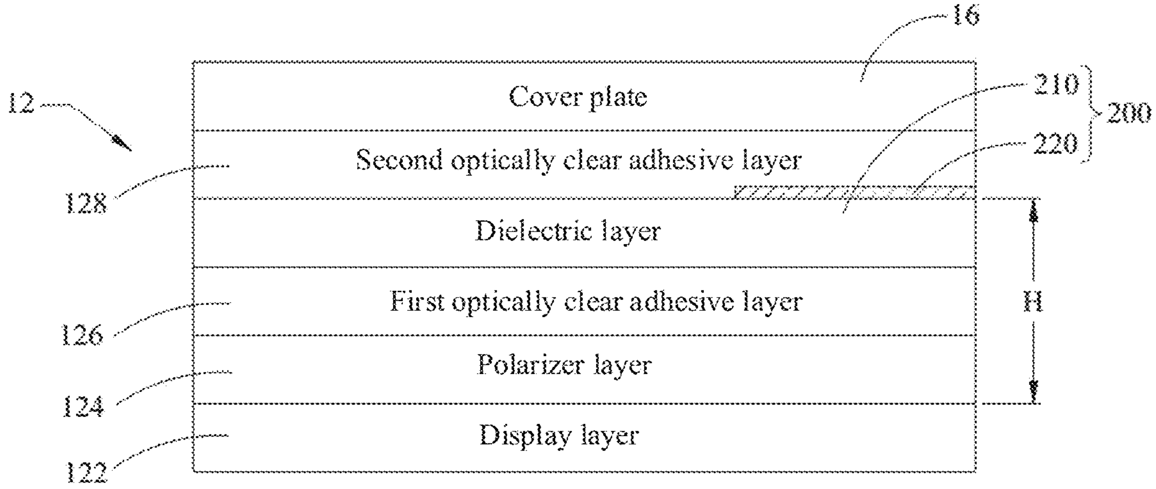
FIG. 5 is a schematic diagram of a cover plate and a display module according to another embodiment of this application.

Refer to FIG. 5. In some other embodiments, the display layer 122, the polarizer layer 124, and the first optically clear adhesive layer 126 are sequentially disposed. The dielectric layer 210 may be correspondingly disposed between the first optically clear adhesive layer 126 and the second optically clear adhesive layer 128. In this embodiment, a distance H between the dielectric layer 210 and the display layer 122 may be approximately 200 μm to 500 μm. For example, the distance H between the dielectric layer 210 and the display layer 122 is 250 μm, 300 μm, 350 μm, 350 μm, 400 μm, 450 μm, or the like.

In some embodiments, based on an actual requirement, the distance H between the dielectric layer 210 and the display layer 122 may be adaptively adjusted within a range of 0.1 mm to 0.5 mm. In other words, the array antenna 220 provided in embodiments of this application has an ultra-low profile feature, to be compatible with display modules 12 of different types and different specifications. The adaptive adjustment may be implemented by adjusting an amount/a thickness of the first optically clear adhesive layer 126, a thickness of the dielectric layer 210, a thickness of the polarizer layer 124, or the like.

In some embodiments, the dielectric layer 210 may be a transparent film layer, and can be processed by using a corresponding printing or etching process. For example, the dielectric layer 210 may be a PET film (Polyester Film, polyester film), a COP film (Cycloolefin Polymer Film, cycloolefin polymer film), a COC film (Copolymers of Cycloolefin Film copolymers of cycloolefin film), a CPI film (Colorless and Transparent Polyimide Film, colorless and transparent polyimide film), or the like. This is not limited in this application.

Figure 6:
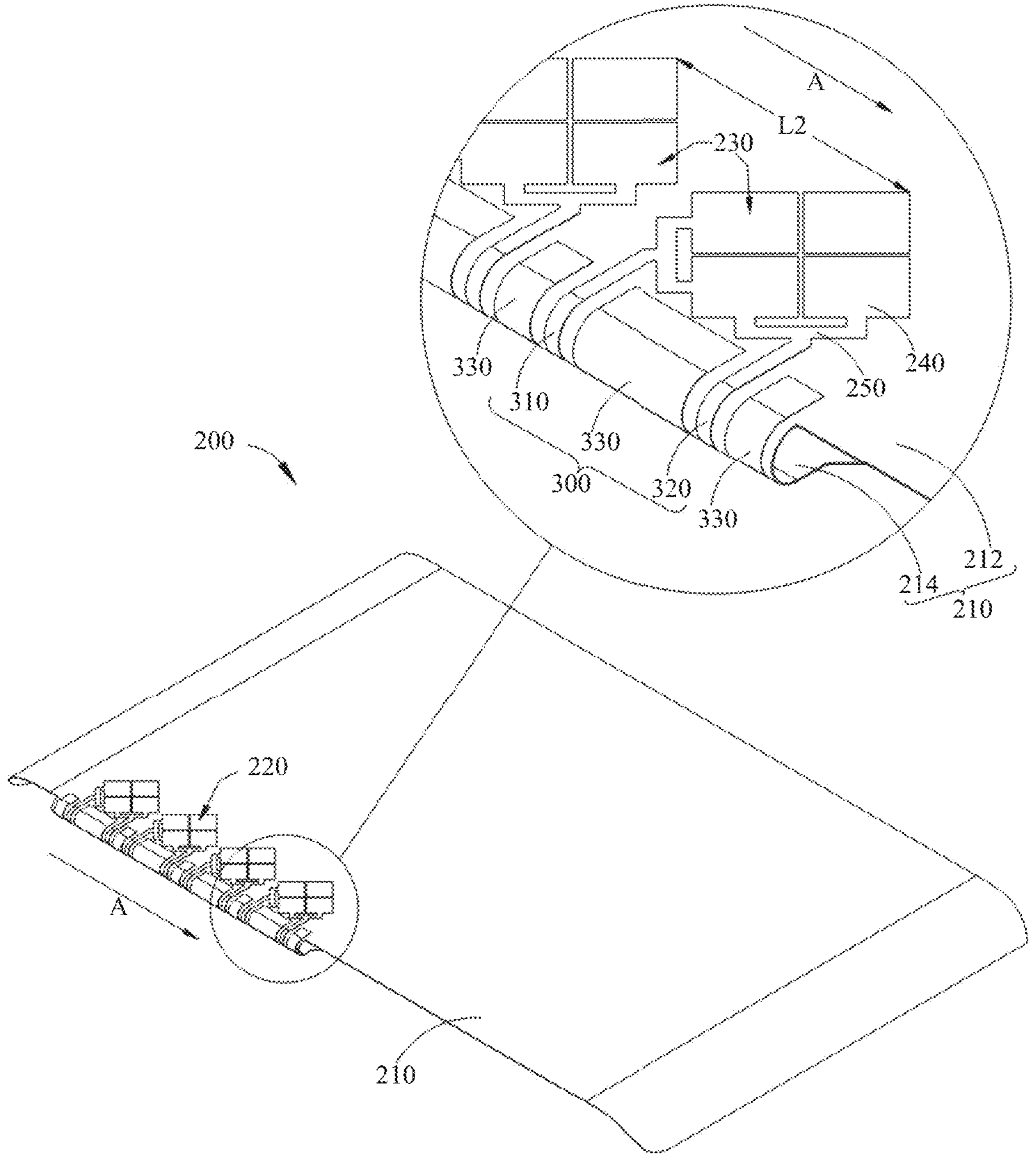
FIG. 6 is a three-dimensional diagram of an antenna membrane according to an embodiment of this application.

Refer to FIG. 6. In some embodiments, the array antenna 220 of the antenna film 200 includes, for example, four patch antennas 230. The four patch antennas 230 are arranged along a preset direction A, to enhance directivity of the array antenna 220 and implement beam scanning.

In some embodiments, the preset direction A may be a width direction of the electronic device 10, the display module 12, or the antenna film 200. In addition, the preset direction A may be a length direction or another direction of the electronic device 10, the display module 12, or the antenna film 200. The another direction may be an oblique diagonal direction of the electronic device 10, the display module 12, or the antenna film 200; or the another direction may be any direction that is at an acute angle with the width direction, or the like.

It should be understood that an arrangement manner of the patch antennas 230 is not limited in embodiments of this application. Therefore, that the four patch antennas 230 are arranged along a preset direction A may also be understood as that the four patch antennas 230 are arranged at intervals along the preset direction A on a whole. For example, the four patch antennas 230 may be disposed on the dielectric layer 210 in a "2×2 grid" shape or a diamond shape on a whole.

In some embodiments, when the electronic device 10 is a mobile phone, an area that is of a screen and that corresponds to the patch antennas 230 may be an area that is less touched by a finger of the user. For example, the patch antennas 230 are disposed close to an upper area of the screen of the mobile phone (which is usually an area close to an area in which a front-facing camera is disposed); or the patch antennas 230 are disposed close to an upper left corner of the screen of the mobile phone; or the patch antennas 230 are disposed close to an upper right corner of the screen of the mobile phone; or the patch antennas 230 are located on one side of the screen of the mobile phone, and are far away from a volume button or a power button of the mobile phone, to improve wireless communication effect of the electronic device 10.

In some other embodiments, the array antenna 220 on the dielectric layer 210 may include two, six, eight, nine, or another quantity of patch antennas 230.

Figure 7:
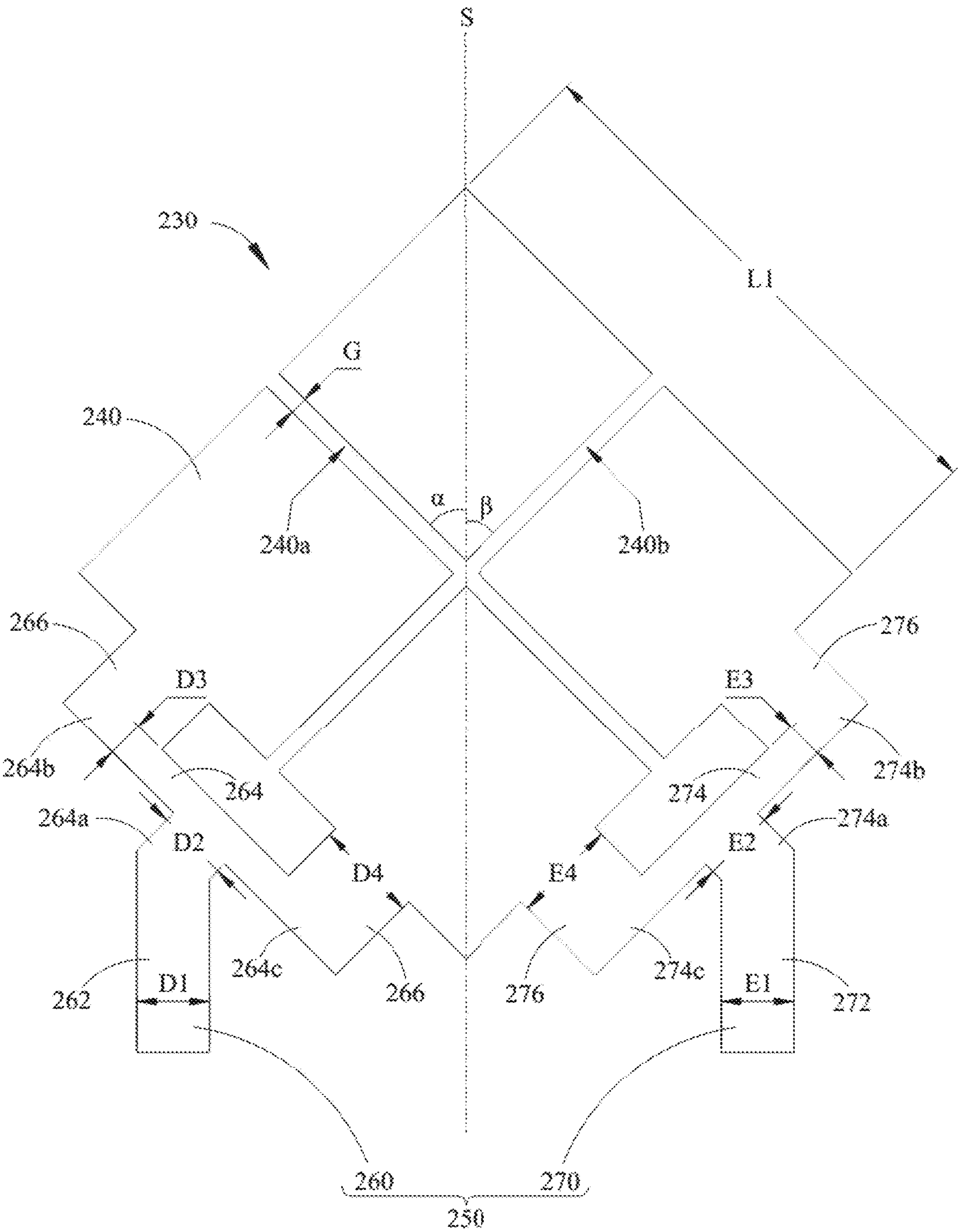
FIG. 7 is a schematic diagram of a patch antenna according to an embodiment of this application.

Refer to both FIG. 6 and FIG. 7. In some embodiments, each patch antenna 230 is an axisymmetric pattern on a whole. In other words, the patch antenna 230 has a virtual symmetry axis S. and the patch antenna 230 is symmetric relative to the virtual symmetry axis S.

In some embodiments, the patch antenna 230 includes a feeding unit 250 and a plurality of patch units 240, and the feeding unit 250 may feed power to the plurality of patch units 240. The plurality of patch units 240 are arranged at intervals, a gap is formed between adjacent surface mount units 240, and the patch units 240 may be coupled through the gap. For example, the plurality of patch antennas 230 may be arranged in a square, a diamond, a rectangle, a circle, a sector, or another shape in general. The gap includes at least a first gap **240*a* and a second gap 240*b*. The first gap 240*a* and the second gap 240*b* are perpendicular to each other, that is, an included angle between the first gap 240*a* and the second gap 240*b* is 90°. It should be understood that, based on impact of a manufacturing process error, a manufacturing process yield rate, and the like that may exist in a manufacturing process, the mutual perpendicularity may also be understood that the first gap 240*a*** and the second gap 240*b* are basically perpendicular. For example, the included angle between the first gap 240*a* and the second gap 240*b* ranges from 80° to 100°, or from 85° to 95°.

In some other embodiments, the included angle between the first gap 240*a* and the second gap 240*b* may range from 60° to 120°. For example, the included angle between the first gap 240*a* and the second gap 240*b* may be 70°, 80°, 100°, 110°, or the like.

It should be understood that, based on the plurality of patch units 240 that are arranged at intervals and coupled through the gap, the patch antenna 230 in embodiments of this application may exhibit a feature different from that of a common antenna, to be used as a metasurface patch antenna.

Further refer to FIG. 7. In some embodiments, the feeding unit 250 may be electrically connected to at least one of the plurality of patch units 240, to directly feed the patch unit 240 that is electrically connected, and another patch unit 240 that is not electrically connected to the feeding unit 250 may implement coupled feeding through the gap (240*a* or 240*b*).

In some embodiments, sizes of all the plurality of patch units 240 are the same, and the sizes being the same may include shapes being the same. As shown in FIG. 7, a shape of the patch unit 240 may be a square, and an overall shape of the patch antenna 230 is also a square. It should be understood that the shape of the patch unit 240 may alternatively be a regular shape, for example, a rectangle, a diamond, or a sector. When the shape of the patch unit 240 is a sector, the sector may be a quarter of a circle, and an overall shape of the patch antenna 230 is a circle.

As shown in FIG. 7, in some embodiments, the first gap 240*a* and the second gap 240*b* are perpendicular to each other. It may be further understood that an included angle α between the virtual symmetry axis S and an edge of the first gap 240*a* corresponding to the patch unit 240 is 45° or approximately 45°. Based on a symmetry relationship between the first gap 240*a* and the second gap 240*b*, an included angle β between the virtual symmetry axis S and an edge of the second gap 240*b* corresponding to the patch unit 240 is 45° or approximately 45°.

In some other embodiments, the included angle between the first gap 240*a* and the second gap 240*b* ranges from 60° to 120°. It may be understood that an included angle between the virtual symmetry axis S and an edge of the first gap 240*a* corresponding to the patch unit 240 ranges from 30° to 60°. Based on a symmetry relationship between the first gap 240*a* and the second gap 240*b*, an included angle β between the virtual symmetry axis S and an edge of the second gap 240*b* corresponding to the patch unit 240 also ranges from 30° to 60°.

In some embodiments, a width G of the gap (240*a* or 240*b*) between the patch units 240 may range from 0.05 mm to 0.15 mm. For example, the width G of the gap (240*a* and 240*b*) is 0.05 mm, 0.06 mm, 0.07 min 0.08 mm, 0.09 mm, 0.1 mm, 0.11 mm, 0.12 mm, 0.13 min, 0.14 mm 0.15 mm, or the like. The width G of the gap (240*a* or 240*b*) may be understood as a shortest distance between the adjacent patch units 240. In addition, the gap (240*a* or 240*b*) may be the first gap 240*a* or the second gap 240*b*. In FIG. 7, the first gap 240*a* is used as an example.

However, based on impact of factors such as the width of the gap and a resonance frequency, a side length L1 of the square patch antenna 230 may range from 2 mm to 4 mm. For example, the side length L1 of the square patch antenna 230 is approximately 3.7 mm; or the side length L1 of the patch antenna 230 is 2 mm, 2.2 mm, 2.5 mm, 2.8 mm, 3.0 mm, 3.3 mm, 3.5 mm, 3.9 mm, 4 mm, or the like. In addition, the side length L1 of the square patch antenna 230 may be greater than 4 mm. For example, the side length L1 of the square patch antenna 230 is 4.1 mm, 4.2 mm, 4.3 mm, or the like.

Refer to FIG. 6. In some embodiments, along the preset direction A, an overall length L2 of each patch antenna 230 may range from 0.5λ to 1λ, that is, 0.5 to 1 wavelength. Alternatively, it may be understood that a distance L2 between virtual symmetry axes S of the adjacent patch antennas 230 ranges from 0.5λ to 1λ. For example, the overall length L2 of each patch antenna 230 may include 0.5λ to 0.8λ, 0.5λ to 0.7λ, 0.6λ, 0.9λ, or the like.

A specific value of the distance L2 between the symmetry axes S of the adjacent patch antennas 230 may range from 5 mm to 10 mm. For example, the distance L2 between the symmetry axes S of the adjacent patch antennas 230 is 5 mm, 5.5 mm, 6 mm, 6.5 mm, 7 mm, 7.5 mm, 8 mm, 8.5 mm, 9 mm, 9.5 mm, 10 mm, or the like.

Further refer to FIG. 6 and FIG. 7. In some embodiments, the feeding unit 250 includes a first feeding branch 260 and a second feeding branch 270. Both the first feeding branch 260 and the second feeding branch 270 may be electrically connected to the patch unit 240, and are configured for dual polarization of the patch antenna 230. The first feeding branch 260 is configured for a first polarization (which may also be referred to as polarization 1) of the patch antenna 230, for example, +45° polarization. It should be understood that the angle is relative to the preset direction A or the virtual symmetry axis S, or may be relative to an edge that is of the screen of the mobile phone and that is close to the patch antenna 230. The second feeding branch 270 is configured for a second polarization (which may also be referred to as polarization 2) of the patch antenna 230, for example, −45° polarization. It should be understood that the angle is relative to the preset direction A or the virtual symmetry axis S, or may be relative to an edge that is of the screen of the mobile phone and that is close to the patch antenna 230.

In some embodiments, the first feeding branch 260 may be electrically connected to the at least two patch units 240 in the patch antenna 230, and the remaining patch units 240 may perform coupled feeding through gaps between the remaining patch units 240 and the at least two patch units 240. Similarly, the second feeding branch 270 may also be electrically connected to the at least two patch units 240 in the patch antenna 230, and the remaining patch units 240 may perform coupled feeding through gaps between the remaining patch units 240 and the at least two patch units 240. It should be understood that similar to the patch unit 240, the first feeding branch 260 and the second feeding branch 270 may be symmetric relative to the virtual symmetry axis S.

In some embodiments, to implement signal transmission and distribution, the first feeding branch 260 includes a first transmission part 262, a first connection part 264, and a first feeding part 266 that are sequentially connected. The first connection part 264 is approximately "T"-shaped or "Y"-shaped, and has a first input end 264*a*, a first output end 264*b*, and a second output end 264*c*. For example, there are two first feeding parts 266, and the two first feeding parts 266 are disposed in parallel, and are configured for +45° polarization.

The first input end 264*a* of the first connection part 264 may be electrically connected to the first transmission part 262. The first output end 264*b* of the first connection part 264 may be electrically connected to one of the two first feeding parts 266, and the second output end 264*c* of the first connection part 264 may be electrically connected to the other of the two first feeding parts 266.

In some embodiments, one of the two first feeding parts 266 may be further electrically connected to one patch unit 240, and the other of the two first feeding parts 266 may be further electrically connected to another patch unit 240, to implement feeding. It should be understood that, the first connection part 264 and the first feeding part 266 may be used as a first power divider, to distribute a signal transmitted by using the first transmission part 262. The first power divider may be, for example, a T type power divider.

Refer to FIG. 7. In some embodiments, a width D1 of the first transmission part 262 ranges from 0.2 mm to 0.8 mm. For example, the width D1 is 0.2 mm, 0.3 mm, 0.4 mm 0.5 mm, 0.6 mm, 0.7 mm, or 0.8 mm. A width D2 of the first input end 264*a* of the first connection part 264 ranges from 0.2 mm to 0.8 m. For example, the width D2 is 0.2 mm, 0.3 mm, 0.4 mm, 0.5 mm, 0.6 mm, 0.7 mm, or 0.8 mm. A width D3 of each of the first output end 264*b* and the second output and 264*c* of the first connection part 264 ranges from 0.1 mm to 0.5 mm. For example, the width D3 is 0.1 mm, 0.2 mm, 0.3 mm, 0.4 mm, or 0.5 mm. A width D4 of the first feeding part 266 ranges from 0.5 mm to 0.8 mm. For example, the width D4 is 0.5 mm, 0.6 mm, 0.7 mm, or 0.8 mm.

Refer to FIG. 7. In some embodiments, similar to the first feeding branch 260, to implement signal transmission and distribution, the second feeding branch 270 includes a second transmission part 272, a second connection part 274, and a second feeding part 276 that are sequentially connected. The second transmission part 272 is parallel to the first transmission part 262. Similar to the first connection part 264, the second connection part 274 is roughly "T"-shaped or "Y"-shaped, and has a second input end 274*a*, a third output end 274*b*, and a fourth output end 274*c*. For example, there are two second feeding parts 276, and the two second feeding parts 276 are disposed in parallel, and are configured for −45° polarization. It should be understood that both directions in which the second feeding part 276 and the first feeding part 266 are disposed are current flow directions. The second feeding part 276 and the first feeding part 266 are perpendicular to each other, to implement dual polarization.

The second input end 274*a* of the second connection part 274 may be electrically connected to the second transmission part 272. The third output end 274*b* of the second connection part 274 may be electrically connected to one of the two second feeding parts 276, and the fourth output end 274*c* of the second connection part 274 may be electrically connected to the other of the two second feeding parts 276.

In some embodiments, one of the two second feeding parts 276 may further be electrically connected to one patch unit 240. The other of the two second feeding parts 276 may be further electrically connected to another patch unit 240, to implement feeding. It should be understood that the second connection part 274 and the second feeding part 276 may be used as a second power divider to distribute signals transmitted by using the second transmission part 272. Similar to the first power divider, the second power divider may be, for example, a T type power divider.

For example, the patch antenna 230 includes four patch units 240. The second feeding part 276 of the first feeding branch 260 and the fourth feeding part of the second feeding branch 270 may be electrically connected to a same patch unit 240.

Refer to FIG. 7. In some embodiments, a width E1 of the second transmission part 272 ranges from 0.2 mm to 0.8 mm. For example, the width E1 is 0.3 mm, 0.4 mm, 0.5 mm, 0.6 mm, or 0.7 mm. A width E2 of the second input end 274*a* of the second connection part 274 ranges from 0.2 mm to 0.8 m. For example, the width E2 is 0.3 mm, 0.4 mm, 0.5 mm, 0.6 mm, or 0.7 mm. A width E3 of each of the third output end 274*b* and the fourth output end 274*c* of the second connection part 274 ranges from 0.1 mm to 0.5 mm. For example, the width E3 is 0.2 mm, 0.3 mm, 0.4 mm, or 0.5 mm. A width E4 of the second feeding part 276 ranges from 0.5 mm to 0.8 mm. For example, the width E4 is 0.6 mm or 0.7 mm.

Further refer to both FIG. 6 and FIG. 7. In some embodiments, the patch antenna 230 may further include a feeding line 300. The feeding line 300 may be electrically connected to the first transmission part 262 and the second transmission part 272 of the feeding unit 250, to implement signal transmission. Based on this, the feeding line 300 may be extended to be electrically connected to the radio frequency chip 183.

It should be understood that the feeding line 300 in embodiments of this application is mainly described by using a coplanar waveguide (CPW, Coplanar Waveguide) as an example. However, this does not constitute a limitation. In some other embodiments, the feeding line 300 may further include a microstrip, a strip wire, or the like.

In some embodiments, based on the CPW, the feeding line 300 may include a first feeding line 310, a second feeding line 320, and a grounding wire 330. There are a plurality of grounding wires 330. The first feeding line 310 and the second feeding line 320 are located between the plurality of grounding wires 330 at intervals, and the grounding wires 330 may be used as reference grounds for the first feeding line 310 and the second feeding line 320. It should be understood that, the first feeding line 310 is electrically connected to the first feeding branch 260, and the second feeding line 320 is electrically connected to the second feeding branch 270. Based on the grounding wires 330, a possibility of generating parasitic capacitance or parasitic inductance due to mutual inductance between the first feeding line 310 and the second feeding line 320 can be decreased, and isolation between the polarization 1 and the polarization 2 of the array antenna 220 can be increased.

In some embodiments, the grounding wires 330 may be located at a same layer as the first feeding line 310 and the second feeding line 320. For example, the grounding wires 330, the first feeding line 310, and the second feeding line 320 are all located at the dielectric layer 210. Based on this, the antenna film 200 is a single-layer structure, and the thickness of the antenna film 200 can be controlled well. The antenna film 200 may be conveniently bent and disposed in the display module 12. However, in terms of a process, for the antenna film 200, processing such as punching to dispose a lead does not need to be performed. A manufacturing process of the antenna film 200 is simple, and assembly difficulty of the corresponding display module 12 is not increased.

Further refer to both FIG. 6 and FIG. 7. In some embodiments, to dispose the feeding line 300, the dielectric layer 210 may include a main part 212 and an extension part 214 located on one side of the main part 212, and both the patch unit 240 and the feeding unit 250 are disposed on the main part 212. The main part 212 of the dielectric layer 210 may be located between the display layer 122 and the first optically clear adhesive layer 126, or the main part 212 of the dielectric layer 210 may be located between the first optically clear adhesive layer 126 and the second optically clear adhesive layer 128. The extension part 214 is correspondingly located outside the display layer 122. To be specific, the surface of the display layer 122 is used as a reference surface, a projection of the main part 212 on the reference surface is located within a range of the display layer 122, and a projection of the extension part 214 on the reference surface is located outside the range of the display layer 122.

In some embodiments, one and of the feeding line 300 is electrically connected to the feeding unit 250 on the main part 212, and the other end of the feeding line 300 extends to the extension part 214. It should be understood that the extension part 214 may be bent relative to the main part 212, to be bound/bonded with the flexible circuit board 181.

Figure 8:
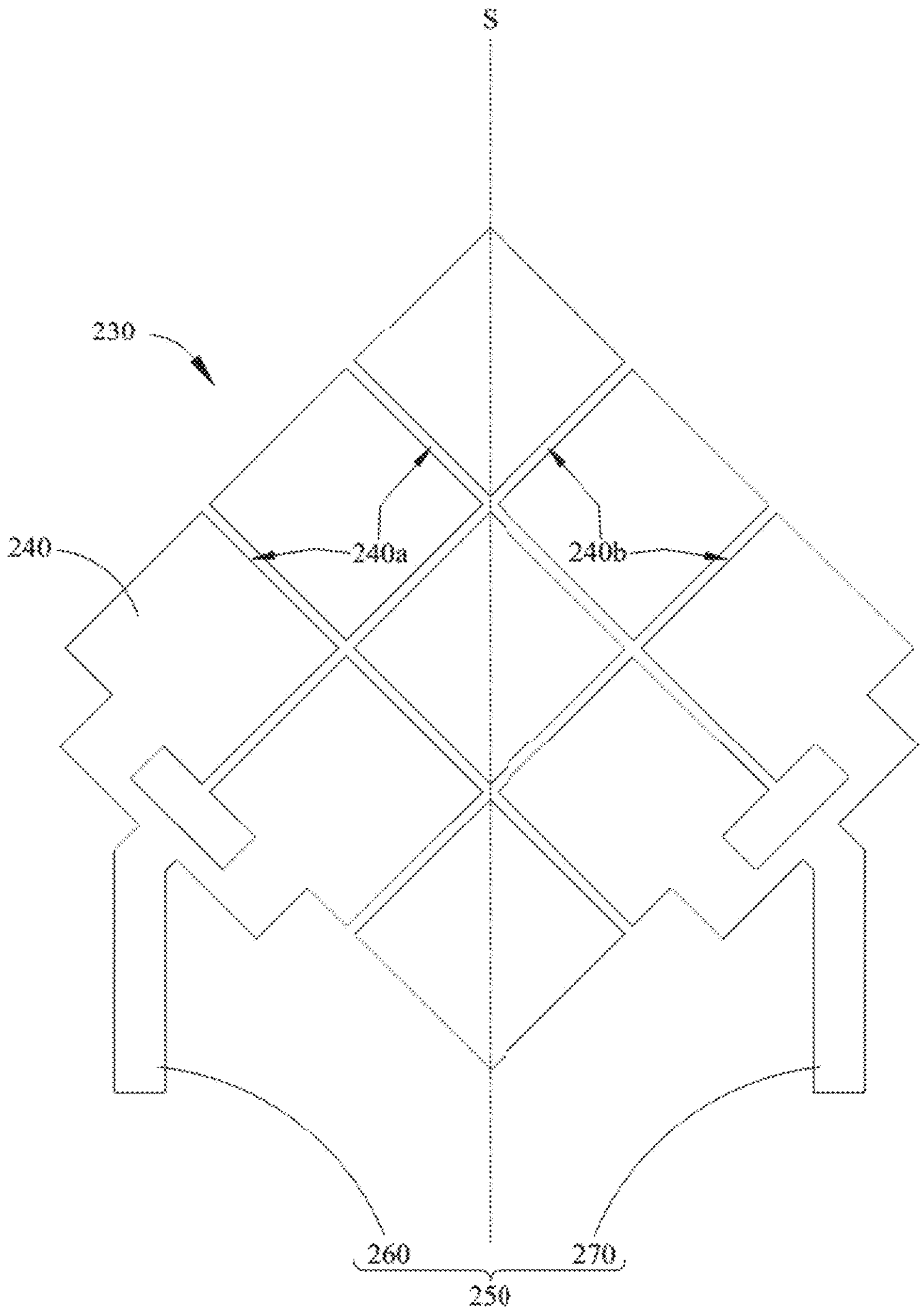
FIG. 8 is a schematic diagram of a patch antenna according to another embodiment of this application.

As shown in FIG. 6 and FIG. 7, each patch antenna 230 includes four patch units 240 in a 2×2 form, and the four patch units 240 are arranged in a square array, for example, in a "2×2 grid" shape. However, this application is not limited thereto. Refer to FIG. 8. In some other embodiments, each patch antenna 230 may also include nine patch units 240 in a 3×3 form. The nine patch units 240 are arranged in a square array on a whole. For example, the patch unit 240 is square, and along an extension direction of a side length of a patch unit 240 (or along an extension direction of a connection line of a central point of adjacent surface mount units 240), the nine patch units 240 are arranged in three rows on a whole, and each row has three patch units 240. Based on this, the patch antenna 230 may have a large radiator or a large radiation area, to enhance overall directivity of the array antenna 220 and increase a gain of the array antenna 220.

As shown in FIG. 6, FIG. 7, and FIG. 8, in some embodiments, the patch unit 240 may include a physical conductive patch. However, this does not constitute a limitation. In some other embodiments, the patch unit 240 may also include a metal mesh (Metal Mesh). A mesh unit of the metal mesh may be a diamond, a circle, a square, or the like. Using the metal mesh as the patch unit 240 can increase a light transmittance of the display module 12 in an area corresponding to the patch antenna 230, and decrease a possibility that the patch antenna 230 is observed by the user.

In some embodiments, for example, the array antenna includes four patch antennas. The radio frequency chip may include eight output ports. The eight output ports may be electrically connected to eight feeding branches of the four patch antennas, to implement a wireless communication function.

Figure 9:
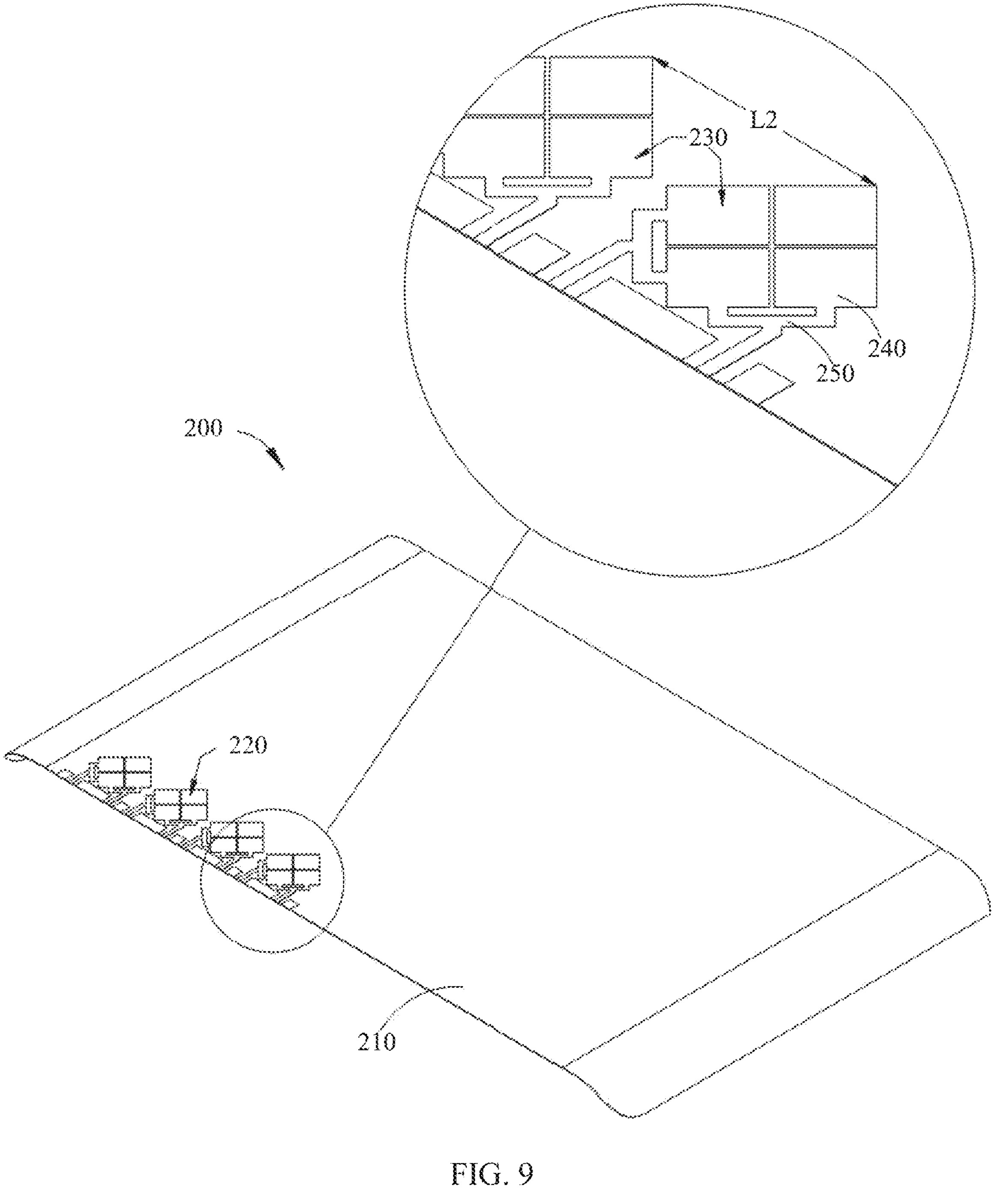
FIG. 9 is a three-dimensional diagram of an antenna film according to another embodiment of this application.
Figure 10:
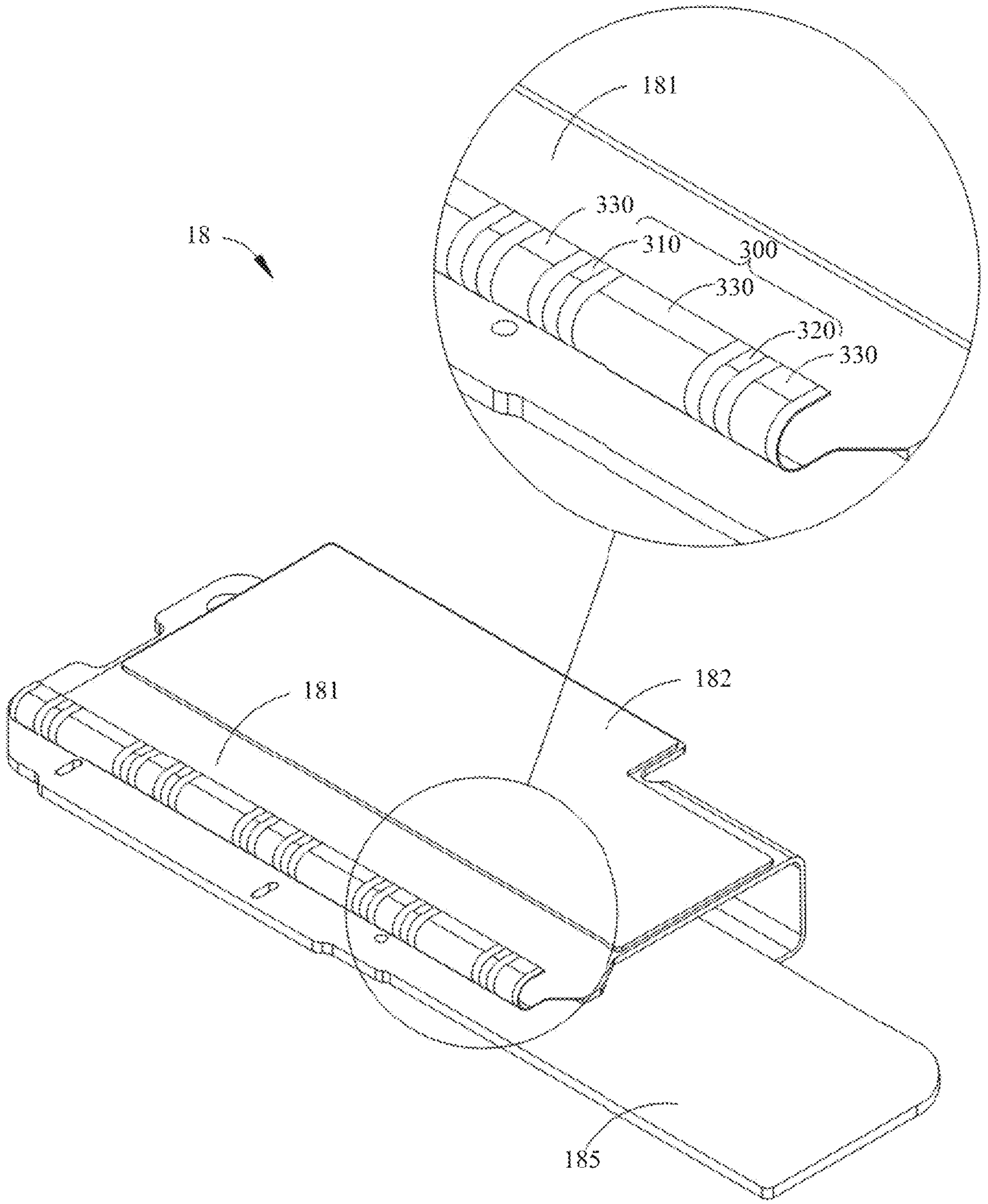
FIG. 10 is a three-dimensional diagram of a circuit board component according to an embodiment of this application.

Refer to both FIG. 9 and FIG. 10. In some other embodiments, the patch antenna 230 may not include the feeding line 300. Correspondingly, the feeding line 300 may be disposed on the flexible circuit board 181. Based on this, both the first transmission part 262 and the second transmission part 272 of the feeding unit 250 may be electrically connected to the feeding line 300 on the flexible circuit board 181, and the feeding line 300 on the flexible circuit board 181 extends to be electrically connected to the radio frequency chip 183. It should be understood that, similar to the patch unit 240, the feeding unit 250 and the feeding line 300 may also be disposed on corresponding structures in a manner of printing, etching, chemical plating, or the like.

Based on this, the dielectric layer 210 may include only the main part 212, and does not include the extension part 214. Correspondingly, the feeding line 300 is disposed on the flexible circuit board 181. The flexible circuit board 181 may be bent and bound/bonded with the dielectric layer 210, to implement an electrical connection between the feeding line 300 and the feeding unit 250.

In some other embodiments, the dielectric layer may include the main part and the extension part. A part of the feeding line may be disposed on the extension part, and the other part of the feeding line may be disposed on the flexible circuit board. After the flexible circuit board is bound/bonded with the extension part of the dielectric layer, an electrical connection between the two parts of the feeding line is implemented.

Figure 11:
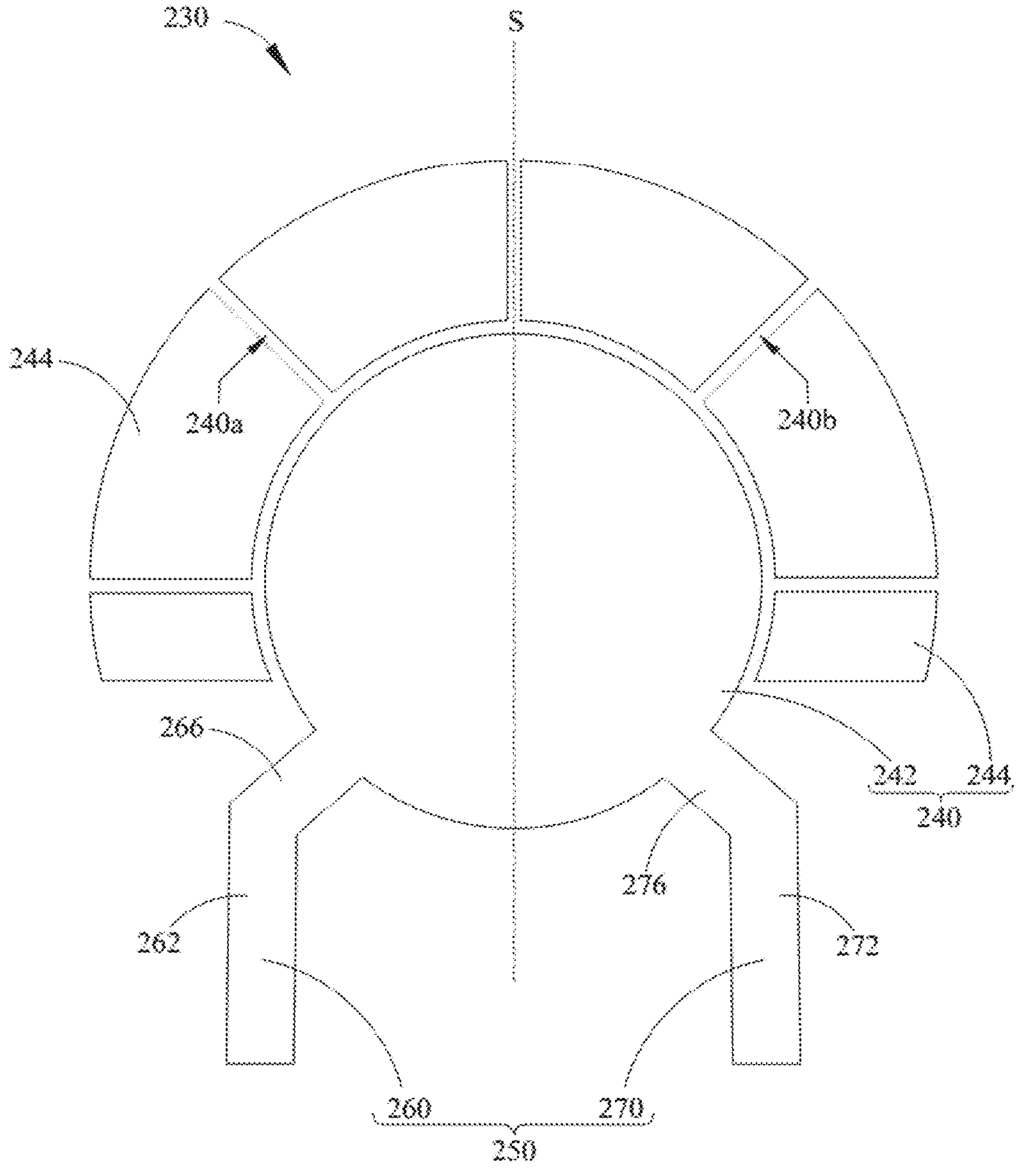
FIG. 11 is a schematic diagram of a patch antenna according to still another embodiment of this application.

Refer to FIG. 11. An embodiment of this application further provides another patch antenna 230. Different from the foregoing patch antenna 230, the patch antenna 230 includes a first patch unit 242 and second patch units 244. There are a plurality of second patch units 244, and all the second patch units 244 are disposed around the first patch unit 242. As shown in FIG. 11, the first patch unit 242 is, for example, a circle, and the plurality of second patch units 244 are, for example, sector rings. A circle center of the second patch unit 244 may coincide with a circle center of the first patch unit 242.

It should be understood that, similar to the foregoing patch antenna 230, based on the first patch unit 242 and the plurality of second patch units 244, the patch antenna 230 may also exhibit a feature different from that of a common antenna, to serve as a metasurface patch antenna.

In some embodiments, the plurality of second patch units 244 may be symmetrically disposed relative to a virtual symmetry axis S. For example, an example of a quantity of second patch units 244 is six, and three second patch units 244 are disposed on each of two sides of the virtual symmetry axis S. Alternatively, an example of a quantity of second patch units 244 is four, and two second patch units 244 are disposed on each of two sides of the virtual symmetry axis S.

In some embodiments, the first patch unit 242 is spaced from the plurality of second patch units 244, and the plurality of second patch units 244 are also spaced from each other, to form a gap between the first patch unit 242 and the second patch unit 244. The first patch unit 242 and the plurality of second patch units 244 may be coupled through gaps. At least a first gap 240*a* and a second gap 240*b* that are perpendicular to each other are formed between the plurality of second patch units 244, and the plurality of second patch units 244 may be used as parasitic units of the patch antenna 230.

In some embodiments, an example of an overall shape formed by the plurality of second patch units 244 is greater than a half ring. However, this does not constitute a limitation. In some other embodiments, a shape formed by the plurality of second patch units 244 may be adjusted based on a required resonance frequency. For example, the shape formed by the plurality of second patch units 244 may be equal to or less than a half ring.

In some embodiments, similar to the foregoing patch antenna 230, in the patch antenna 230, both a first feeding branch 260 and a second feeding branch 270 of a feeding unit 250 are symmetric relative to the virtual symmetry axis S, so that dual polarization of the patch antenna 230 can be implemented. However, different from the foregoing patch antenna 230, in the patch antenna 230, both the first feeding branch 260 and the second feeding branch 270 are electrically connected to the first patch unit 242, to directly feed the first patch unit 242. Correspondingly, the plurality of second patch units 244 disposed around the first patch unit 242 are coupled and fed through the gap.

In some embodiments, the first feeding branch 260 includes a first transmission part 262 and a first feeding part 266, and the second feeding branch 270 includes a second transmission part 272 and a second feeding part 276. The first transmission part 262 and the second transmission part 272 are parallel to each other, and may be electrically connected to a feeding line 300. For example, there is one first feeding part 266 and one second feeding part 276, and the first feeding part 266 and the second feeding part 276 are perpendicular to each other, to implement dual polarization.

In some embodiments, the first slot 240*a* may be disposed in an extension direction of the second feeding part 276, and the second gap 240*b* may be disposed in an extension direction of the first gap 240*a*.

Figure 12:
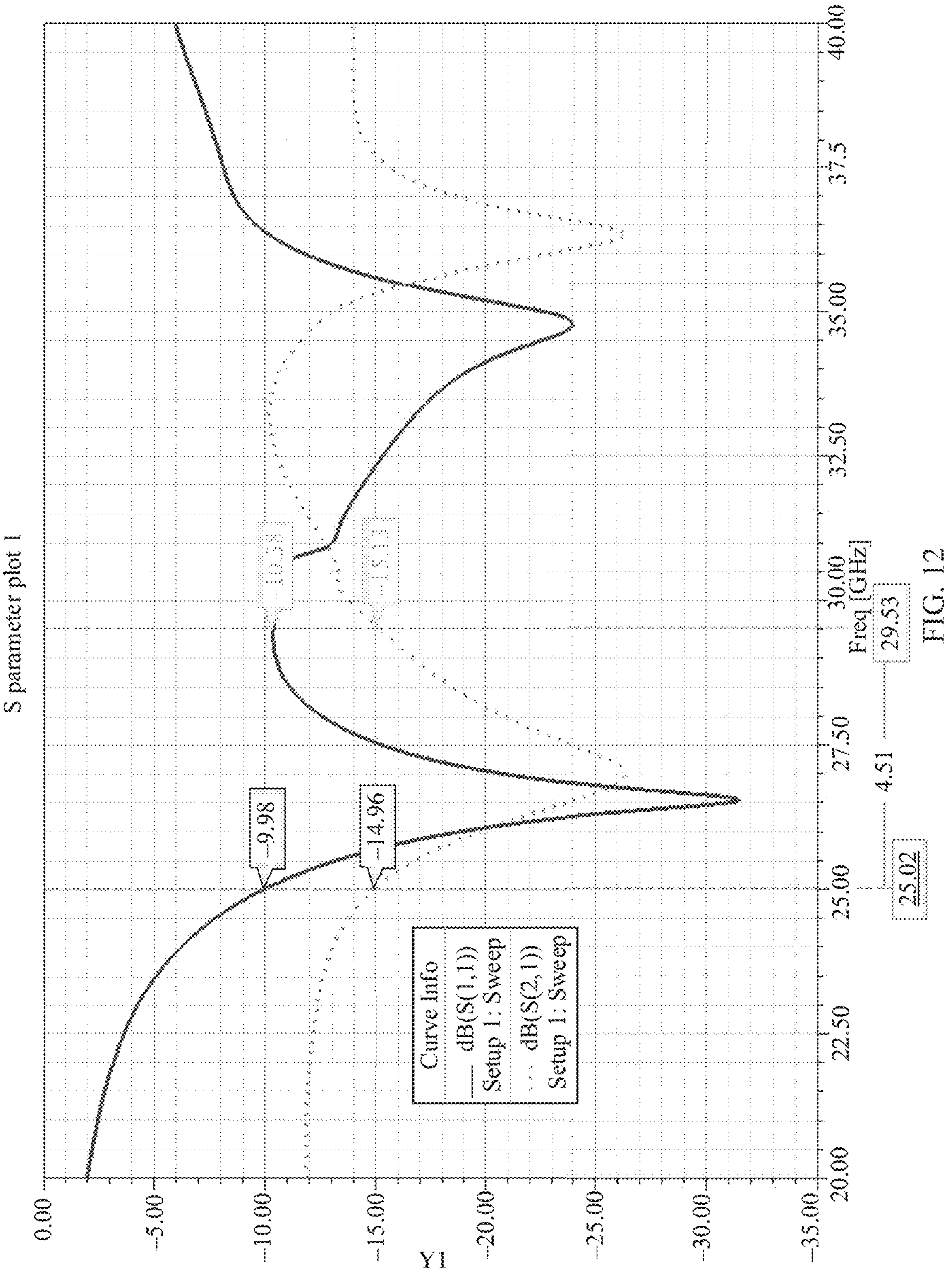
FIG. 12 is a data diagram of an S parameter of a patch antenna according to an embodiment of this application.

FIG. 12 is a data diagram of an S parameter of a patch antenna. It can be learned from FIG. 12 that, in the patch antenna provided in embodiments of this application, in a high-bandwidth band range from 25 GHz to 35 GHz, an antenna return loss S11 of the patch antenna is greater than −10 dB. In the high-bandwidth band range from 25 GHz to 29.5 GHz, antenna isolation S12 is better than −15 dB.

Figure 13:
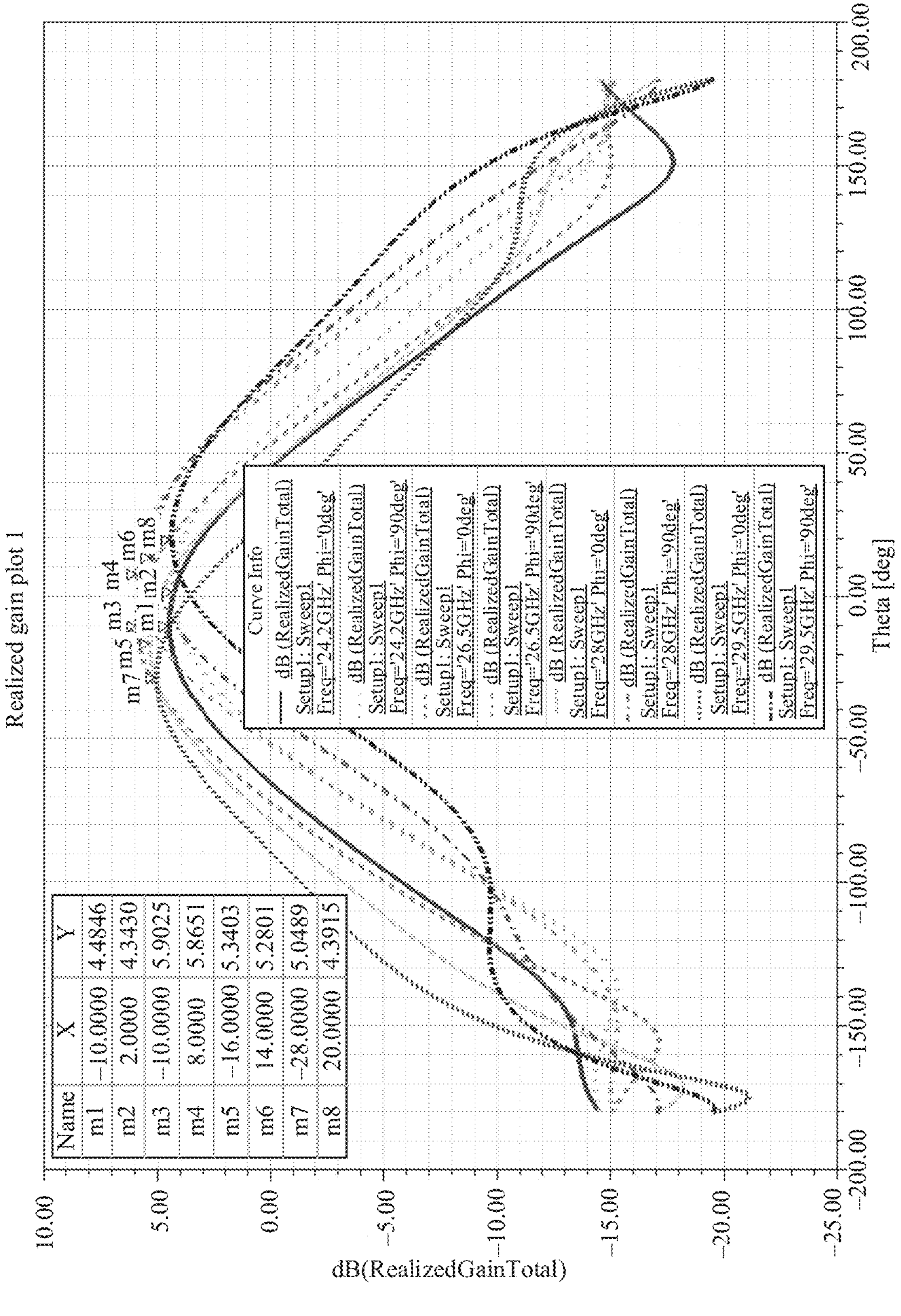
FIG. 13 is a diagram of a gain of +45° polarization of a patch antenna according to an embodiment of this application.
Figure 14:
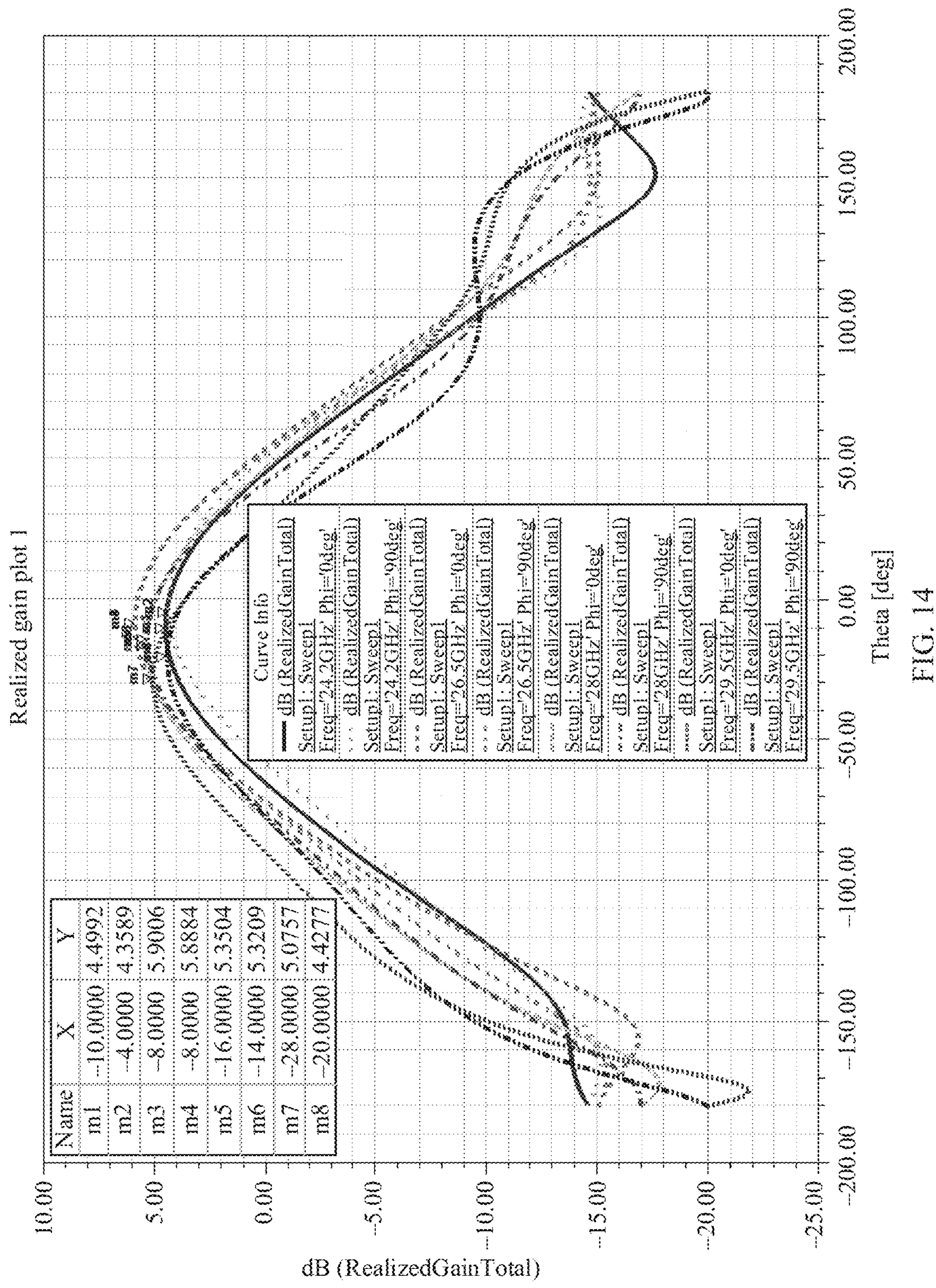
FIG. 14 is a diagram of a gain of −45° polarization of a patch antenna according to an embodiment of this application.

FIG. 13 is a diagram of a gain of +45° polarization of a patch antenna, and FIG. 14 is a diagram of a gain of −45° polarization of a patch antenna. It can be learned from FIG. 13 and FIG. 14 that, in the patch antenna provided in embodiments of this application, a gain of +45° polarization may reach 4.5 dBi to 5.9 dBi, and a gain of −45° polarization may reach 4.4 dBi to 5.9 dBi, to meet a wireless communication requirement of a user.

Figure 15:
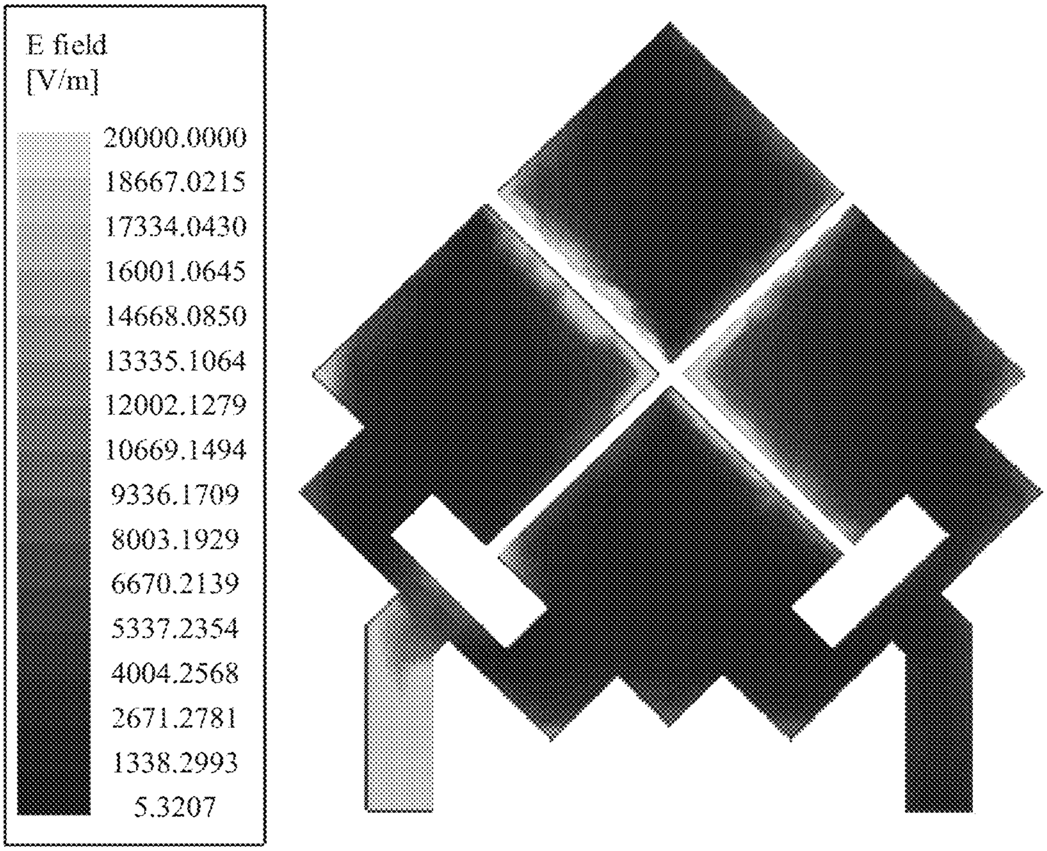
FIG. 15 is a diagram of an electric field of +45° polarization of a patch antenna at 26 GHz according to an embodiment of this application.
Figure 16:
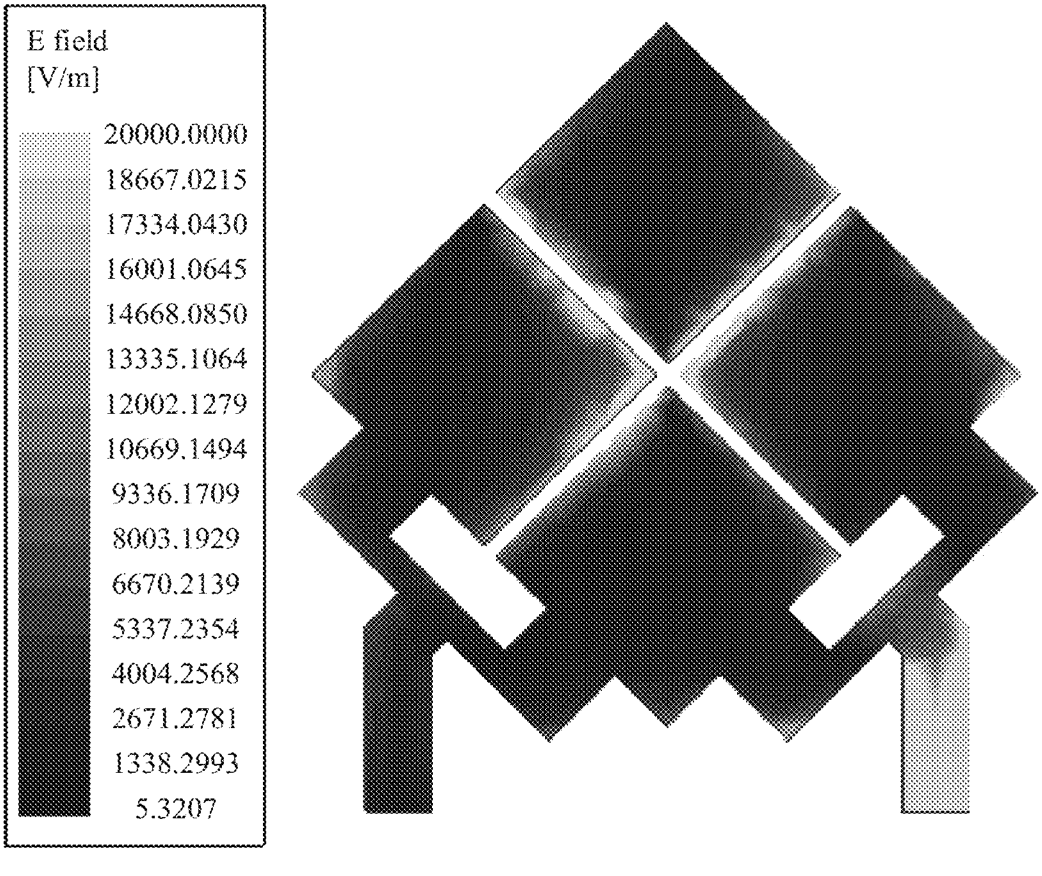
FIG. 16 is a diagram of an electric field of −45° polarization of a patch antenna at 26 GHz according to an embodiment of this application.

FIG. 15 is a diagram of an electric field of +45° polarization of a patch antenna at 26 GHz, and FIG. 16 is a diagram of an electric field of −45° polarization of a patch antenna at 26 GHz. It can be learned from FIG. 15 and FIG. 16 that, in the patch antenna provided in embodiments of this application, each patch unit has a strong electric field at an adjacent edge, that is, the patch unit has a strong electric field in an area close to a gap, to radiate an electromagnetic wave to free space or receive an electromagnetic wave.

The foregoing descriptions are merely specific implementations of this application. It should be noted that a person of ordinary skill in the art may make several improvements and polishing without departing from the principle of this application and the improvements and polishing shall also fall within the protection scope of this application.

What is claimed is:

1. A patch antenna comprising:

a plurality of patch units arranged at intervals, units;

a gap formed between adjacent patch units and coupling the patch units;

a first feeding branch comprising a first feeding part, electrically connected to at least one patch unit of the plurality of patch units, and configured for a first polarization of the patch antenna; and a second feeding branch comprising a second feeding part, electrically connected to at least one patch unit of the plurality of patch units, and configured for a second polarization of the patch antenna, wherein the first feeding branch and the second feeding branch are symmetric relative to a virtual symmetry axis, wherein an angle between the first feeding part and the virtual symmetry axis is +45°, and wherein an angle between the second feeding part and the virtual symmetry axis is −45°.

2. The patch antenna of claim 1, wherein the gap comprises a first gap and a second gap perpendicular to each other.

3. The patch antenna of claim 2, wherein the first feeding branch is located on a first side of the virtual symmetry axis, and wherein the first feeding part is configured to directly feed the at least one patch unit.

4. The patch antenna of claim 3, wherein the second feeding branch is located on a second side of the virtual symmetry axis, and wherein the second feeding part is configured to directly feed the at least one patch unit.

5. The patch antenna of claim 3, further comprising two feeding parts disposed in parallel and electrically connected to two patch units in the plurality of patch units.

6. The patch antenna of claim 3, wherein the plurality of patch units comprises a plurality of second patch units disposed equidistant around a first patch unit, and wherein the first patch unit and the plurality of second patch units are coupled through gaps formed between adjacent patch units of the plurality of second patch units and formed between the plurality of second patch units and the first patch unit.

7. The patch antenna of claim 6, wherein the gap formed between the adjacent patch units of the plurality of second patch units comprises the first gap and the second gap, and wherein the first gap and the second gap are perpendicular to each other, or an angle between the first gap and the second gap ranges from 60° to 120°.

8. The patch antenna of claim 2, wherein a width of the first gap ranges from 0.05 millimeters (mm) to 0.15 mm, and wherein a width of the second gap ranges from 0.05 mm to 0.15 mm.

9. The patch antenna of claim 1, wherein sizes of all patch units of the plurality of patch units are uniform.

10. The patch antenna of claim 1, wherein when a quantity of the plurality of patch units is four patch units, the four patch units are arranged at intervals in a 2×2 form, and wherein when a quantity of the plurality of patch units is nine patch units, the nine patch units are arranged at intervals in a 3×3 form.

11. The patch antenna of claim 1, wherein the plurality of patch units comprises a transparent conductive patch, or wherein the plurality of patch units comprises a metal mesh.

12. A display module comprising:

a display layer having a display function; and an antenna film disposed on the display layer and comprising:

a patch antenna comprising:

a plurality of patch units arranged at intervals and symmetric relative to a virtual symmetry axis;

a gap formed between adjacent patch units and coupling the patch units;

a first feeding branch configured for a first polarization of the patch antenna; and a second feeding branch configured for a second polarization of the patch antenna, wherein the patch antenna is configured to use the display layer as a reference ground, and wherein the first feeding branch and the second feeding branch are symmetric relative to the virtual symmetry axis and electrically connected to at least one patch unit of the plurality of patch units.

13. The display module of claim 12, wherein the patch antenna further comprises a feeding line comprising:

a first feeding line electrically connected to the first feeding branch; and a second feeding line electrically connected to the second feeding branch.

14. The display module of claim 13, wherein the antenna film further comprises a dielectric layer, wherein the dielectric layer comprises:

a main part;

an extension part located on one side of the main part;

a patch unit located on the main part; and
a feeding unit located on the main part,
wherein the feeding line is located on the extension part and is configured to be electrically connected to a circuit board component.

15. The display module of claim 12, wherein a distance between symmetry axes of adjacent patch antennas ranges from 5 millimeter (mm) to 10 mm.

16. The display module of claim 12, further comprising a polarizer layer, wherein the antenna film is located between the display layer and the polarizer layer, or the polarizer layer is located between the display layer and the antenna film.

17. The display module of claim 16, wherein a distance between the antenna film and the display layer ranges from 100 micrometer (μm) to 500 μm.

18. An electronic device comprising:
a circuit board component; and
a display module electrically connected to the circuit board component and comprising:
a display layer having a display function; and
an antenna film disposed on the display layer, wherein the antenna film comprises:
a patch antenna comprising:
a plurality of patch units arranged at intervals and symmetric relative to a virtual symmetry axis;
a gap is formed between adjacent patch units and coupling the patch units;
a first feeding branch configured for a first polarization of the patch antenna; and
a second feeding branch configured for a second polarization of the patch antenna,
wherein the patch antenna is configured to use the display layer as a reference ground,
wherein the first feeding branch and the second feeding branch are symmetric relative to the virtual symmetry axis and electrically connected to at least one patch unit of the plurality of patch units.

19. The electronic device of claim 18, wherein the circuit board component comprises:
a flexible circuit board; and
a radio frequency chip disposed on the flexible circuit board, and wherein the flexible circuit board is electrically connected to the radio frequency chip and the patch antenna.

20. The electronic device of claim 18, wherein the patch antenna further comprises a feeding line comprising:
a first feeding line electrically connected to the first feeding branch; and
a second feeding line electrically connected to the second feeding branch.

* * * * *